United States Patent [19]

Heller et al.

[11] Patent Number: 5,667,820

[45] Date of Patent: *Sep. 16, 1997

[54] APPARATUS FOR MAKING A SOLID THREE-DIMENSIONAL ARTICLE FROM A LIQUID MEDIUM

[75] Inventors: Timmy B. Heller, Attleboro, Mass.; Ray M. Hill, Smithfield, R.I.; Michael R. Greenhalgh, Taunton, Mass.; Abdalla F. Saggal, Pawtucket, R.I.

[73] Assignee: 3D Systems, Inc., Valencia, Calif.

[*] Notice: The term of this patent shall not extend beyond the expiration date of Pat. No. 5,071,337.

[21] Appl. No.: 475,715

[22] Filed: Jun. 7, 1995

Related U.S. Application Data

[63] Continuation of Ser. No. 299,879, Sep. 1, 1994, abandoned, which is a continuation of Ser. No. 909,528, Jun. 30, 1992, Pat. No. 5,358,673, which is a continuation of Ser. No. 802,242, Dec. 9, 1991, abandoned, and a continuation-in-part of Ser. No. 655,948, Feb. 14, 1991, abandoned, said Ser. No. 802,242, is a continuation-in-part of Ser. No. 655,948, which is a continuation-in-part of Ser. No. 479,702, Feb. 15, 1990, Pat. No. 5,071,337.

[51] Int. Cl.$^6$ .................... B29C 35/08; B29C 41/02; B29C 41/52
[52] U.S. Cl. .................. 425/135; 250/432 R; 250/492.1; 364/468.27; 425/174.4; 425/217
[58] Field of Search .................. 264/401; 425/135, 425/174.4, 217; 156/378, 379.6, 538; 118/428, 429, 500, 603, 620, 693, 712; 250/432 R, 492.1; 364/468, 476, 468.27; 365/106, 107, 119, 120, 126, 127; 395/119

[56] References Cited

U.S. PATENT DOCUMENTS 4,961,154  10/1990  Pomerantz et al. .................. 395/119

FOREIGN PATENT DOCUMENTS

| 2263777 | 7/1973 | Germany . | |
|---|---|---|---|
| 61-217219 | 9/1986 | Japan | 264/401 |
| 62-275734 | 11/1987 | Japan | 264/401 |
| 64-31625 | 2/1989 | Japan | 425/135 |
| 3-246025 | 11/1991 | Japan | 264/401 |

OTHER PUBLICATIONS

English Translation of Japan 61-217,219 (Published Sep. 26, 1986).

Primary Examiner—Leo B. Tentoni
Attorney, Agent, or Firm—Dennis R. Smalley

[57] ABSTRACT

A solid three-dimensional article is formed from a liquid medium by initially coating a layer of the liquid medium on a fixedly mounted apertured support plate. An initial cross-section or profile of the article then is formed by solidifying the liquid medium, or at least a portion thereof, on the support plate. In another embodiment, each layer of the liquid medium is formed by dispensing the entire layer from above the fixed support plate. In a further embodiment, a device is disclosed for dispensing a liquid medium in layers of uniform thickness on the medium surface of a laser modeling machine, for solidification when subjected to prescribed energy. The dispenser comprises an elongated applicator or coating bar of rectangular, essentially solid construction, with a liquid medium reservoir and dispensing passageways located adjacent a dispensing side of the bar. A feed tube and traversing mechanism support rods are secured to an opposite side of the bar. The dispensing passageways may be apertures arranged in multiple rows, with the apertures in at least one row offset with respect to the apertures in the other rows, for more uniform dispensing. In the alternative, the passageways may be inclined slots having portions overlapping in a direction extending longitudinally of the bar.

20 Claims, 31 Drawing Sheets

STEP I

COAT FIRST LIQUID MEDIUM LAYER ON SUPPORT.

STEPS 2 & 3

SOLIDIFY FIRST ARTICLE CROSS-SECTION AND RAISE SCANNER HEAD (AND COATING MECHANISM) TO THE NEXT FOCUS LEVEL.

STEP 4

RAISE LIQUID MEDIUM LEVEL ONE LAYER TO FORM MENISCUS AROUND SOLIDIFIED FIRST ARTICLE CROSS-SECTION.

STEP 5

COAT NEXT LIQUID MEDIUM LAYER ON SOLIDIFIED
FIRST ARTICLE CROSS-SECTION.

STEP 6

MENISCUS BREAKS AND LIQUID
MEDIUM LAYERS MERGE.

STEPS 7 & 8

SOLIDIFY NEXT ARTICLE CROSS-SECTION AND RAISE SCANNER HEAD (AND COATING MECHANISM) TO THE NEXT FOCUS LEVEL.

REPEAT LIQUID MEDIUM LEVEL RAISING, COATING, SOLIDIFYING AND SCANNER HEAD (AND COATING MECHANISM) RAISING STEPS TO COMPLETE ARTICLE.

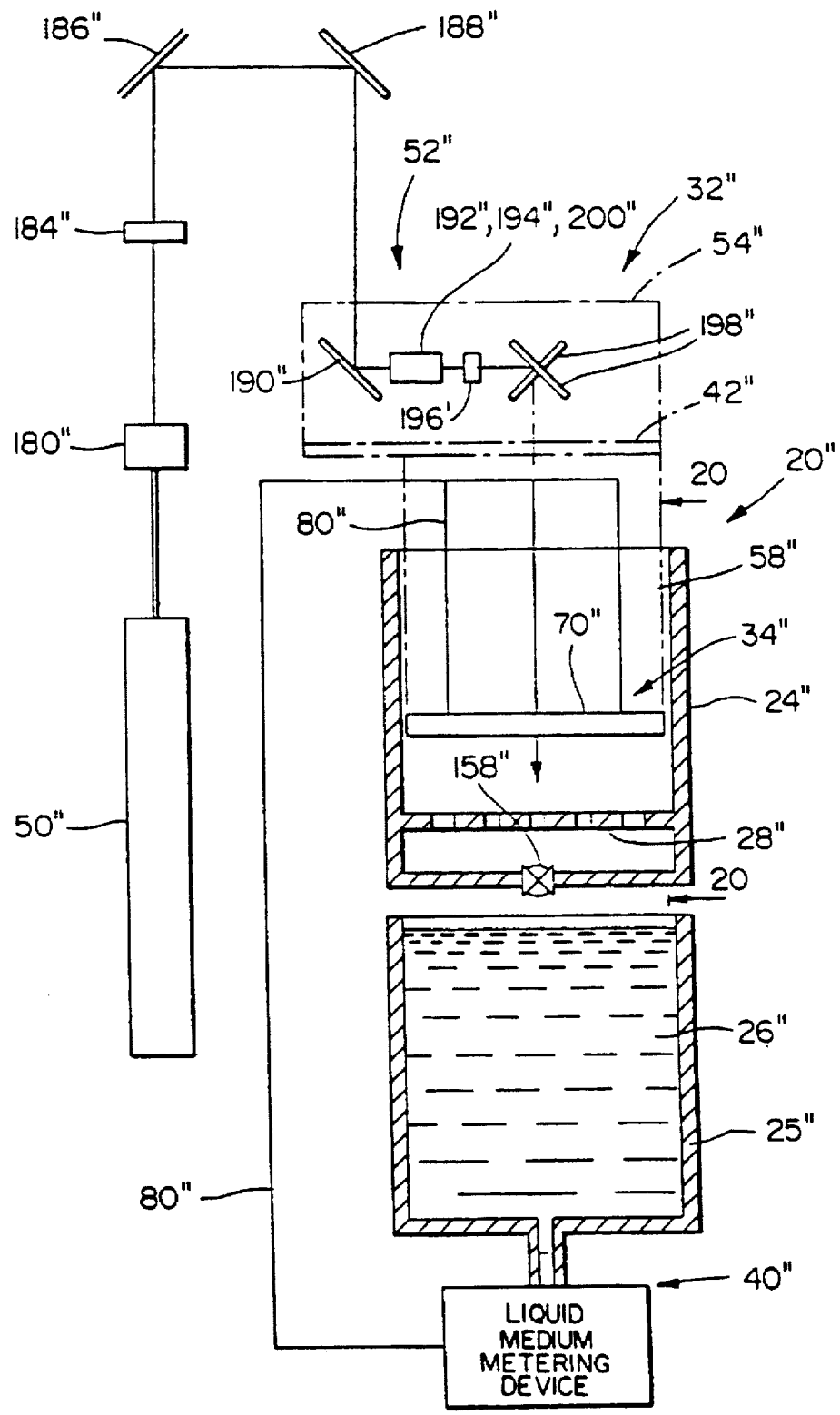

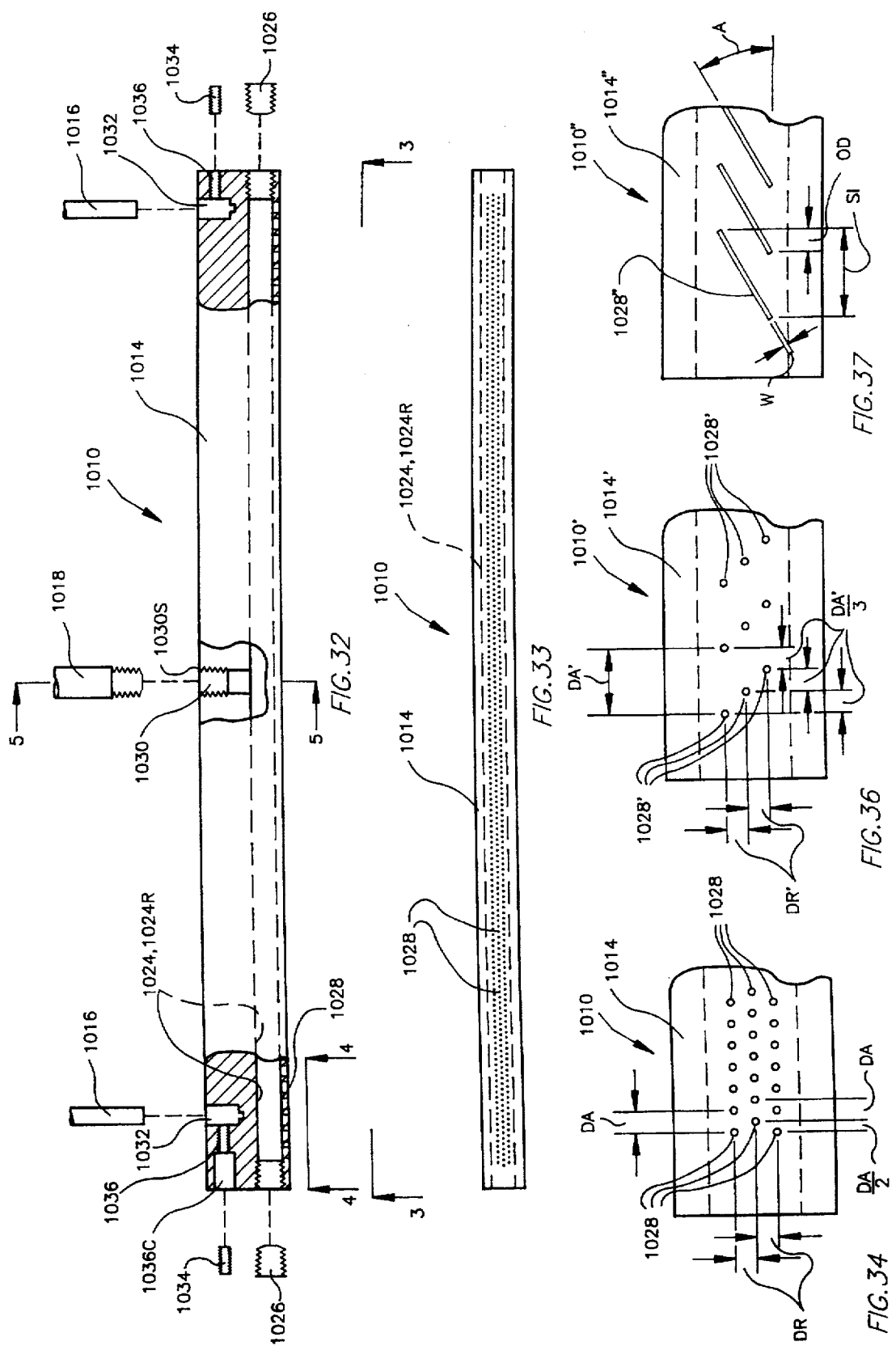

APPARATUS FOR MAKING A SOLID THREE-DIMENSIONAL ARTICLE FROM A LIQUID MEDIUM

This application is a continuation of U.S. patent application Ser. No. 08/299,879, filed Sep. 1, 1994, now abandoned; which is a continuation of U.S. patent application Ser. No. 07/909,528, filed Jun. 30, 1992, now U.S. Pat. No. 5,358,673; which is a continuation-in-part of U.S. patent application Ser. No. 07/802,242, filed Dec. 9, 1991, now abandoned, and a continuation-in-part of Ser. No. 07/655,948, filed Feb. 14, 1991, now abandoned, said Ser. No. 07/802,242 is a continuation-in-part of Ser. No. 07/655,948, as noted above, filed Feb. 14, 1991, now abandoned, which is a continuation-in-part of Ser. No. 07/479,702, filed Feb. 15, 1990, now U.S. Pat. No. 5,071,337.

BACKGROUND OF THE INVENTION

1. Field of the Invention

This invention relates to an applicator or coating device for dispensing a liquid medium in the forming of a solid three-dimensional article wherein the liquid medium is capable of solidification when subjected to prescribed energy, and more particularly to a specially configured applicator bar for dispensing the liquid medium in relatively thin layers of uniform thickness for the successive solidification thereof, so as to form the article in a very precise manner.

2. Description of the Prior Art

In general, apparatus for forming a solid three-dimensional article from a liquid medium capable of solidification when subjected to prescribed energy are known in the prior art. For example, U.S. Pat. No. 2,755,578 to O. J. Munz discloses a system for generating three-dimensional objects from a liquid medium by irradiating liquid layers with the aid of a computer programmed irradiation source and a translational mechanism. Other arrangements of this general type are disclosed in an article by H. Kodama, entitled "Automatic Method for Fabricating a Three-Dimensional Plastic Model With Photo-Hardening Polymer," Review Scientific Instruments, Vol. 52, No. 11, November 1981, pages 1770–1773, and an article by A. J. Herbert, entitled "Solid Object Generation," Journal of Applied Photographic Engineering 8 (4), August 1982, pages 185–188. A similar arrangement is disclosed in reexamined U.S. Pat. No. 4,575,330 to C. W. Hull, in which Reexamination Certificate B1 4,575,330 was issued on Dec. 19, 1989. Other prior art of interest includes the U.S. Pat. Nos. 2,525,532 to Dreywood, 2,381,234 to Symmes, 3,723,120 to Hummel, 3,609,707 to Lewis et al., 4,081,276 to Crivello and 4,252,514 to Gates, and the British Patent No. 566,795 to Gates.

However, a need still exists for a method of and apparatus for forming a solid three-dimensional article from a liquid medium in an accurate, rapid and expeditious manner, with a minimum of waste in time and material, and a primary purpose of this invention is to provide such a method and apparatus.

SUMMARY OF THE INVENTION

In general, the subject invention relates to a method of and apparatus for forming a solid three-dimensional article from a liquid medium capable of solidification when subjected to prescribed energy, wherein by way of illustration, a fixed support may be provided in a container for holding the liquid medium. A layer of the liquid medium in the container is then produced above the fixed support, and a preselected cross-section of the layer is solidified by exposing at least a portion of the layer to prescribed energy in accordance with a design for the three-dimensional article. The liquid medium layer-producing and solidifying steps are then repeated, as necessary, to form the solid three-dimensional article. Each layer of the liquid medium is produced either partially, or entirely, by dispensing the liquid medium from above the support.

For example, in one embodiment in accordance with the invention, a first incremental layer of the liquid medium is initially coated on a support. A preselected cross-section of the first incremental layer of the liquid medium then is solidified by exposing at least a portion of the layer to prescribed energy, to form a first cross-section of the solid three-dimensional article. The level of the liquid medium surrounding the solidified first cross-section then is raised so as to form a meniscus around the periphery of the first cross-section. Next, the solidified first cross-section is coated with a second incremental layer of the liquid medium, so that the meniscus surrounding the solidified cross-section is broken and the second incremental layer of the liquid medium and the liquid medium surrounding the second cross-section flow together. This is followed by solidifying a second preselected cross-section of the liquid medium by exposing the liquid medium to prescribed energy, to form a second cross-section of the solid three-dimensional article. Thereafter, the liquid medium level raising, liquid medium coating and liquid medium solidifying operations, are repeated, as necessary, to complete the three-dimensional article.

In another embodiment in accordance with the invention, each layer of the liquid medium is produced above a fixed support in the container for holding the liquid medium, by dispensing the entire layer from above the fixed support in the container, across the entire width of the container. A preselected cross-section of the layer then is solidified by exposing at least a portion of the layer to prescribed energy in accordance with a design for the three-dimensional article. The liquid medium layer-producing and solidifying steps then are repeated, as necessary, to form the solid three-dimensional article.

More specifically, the coating of the first incremental layer on the support and the subsequent liquid medium coating steps in the alternative embodiment may be performed by spraying or another type of dispensing operation, while the solidifying steps are performed by lasering, using a laser beam which may be controlled by an RF laser beam modulator. The liquid medium is held in the container, and the support for the solid three dimensional article as it is formed is of apertured construction and removably mounted in a fixed position in the container. One type of coating mechanism may be in the form of an elongated apertured tube, which has aperture-closing pins selectively operated by solenoids, or which has rows of small dispensing apertures of a size such that the liquid medium flows therefrom only under pressure. The apertured tube also may be positioned closely adjacent the previously coated layer so that the liquid medium is dispensed from the tube in a uniform, controlled manner by capillary action and surface tension. In the alternative, the coating mechanism may be in the form of an outer elongated cylinder and an inner elongated cylinder mounted in relatively rotatable coaxial relationship, with each cylinder including an elongated slot, and with a mechanism for causing relative rotation between the cylinders to cause relative movement of the elongated slots between a non-aligned closed relationship and an aligned coating relationship.

Further, the liquid medium may be fed to the coating mechanism by a mechanism for withdrawing liquid medium from a lower portion of the container or a separate lower container, and feeding the liquid medium to the coating mechanism. The withdrawing-and-feeding mechanism may include a double acting piston in a cylinder and include valves for controlling flow of the liquid medium to and from the piston and cylinder, or may be a digital metering pump. The coating mechanism may be mounted for horizontal reciprocating movement above the support by a gear rack or ball screw mechanism and associated drive, or may be mounted for oscillating swinging movement above the support. Raising of the liquid level in the container in the first embodiment may be accomplished by an expandable member, such as a bellows in the bottom portion of the associated container and operable in response to fluid pressure, and the solidifying mechanism and the coating mechanism in both of the embodiments may be mounted for vertical movement relative to the article support.

In a further embodiment, the dispensing device comprises an elongated bar member of essentially solid construction having an elongated passageway formed longitudinally therethrough to define a liquid medium reservoir. A means is located in the bar for receiving the liquid medium and includes a feed passage extending through the bar into the liquid medium reservoir, with means being provided at opposite ends of the bar for retaining the liquid medium in the reservoir. Further, dispensing passageways are formed in the bar and extend from the reservoir to a dispensing lower side thereof, and means are provided at opposite ends of the bar for supporting it on a traversing mechanism.

More specifically, the elongated bar member can preferably be of rectangular construction with the liquid medium reservoir located adjacent the dispensing lower side of the bar and the feed tube-receiving means and the device support means located adjacent an opposite upper side of the bar. The dispensing passageways may be cylindrical apertures arranged in the bar in longitudinally extending rows, with the exit opening of the apertures in at least one row offset longitudinally with respect to the exit openings of the apertures in a second row. At least three rows of dispensing apertures are preferably provided, with the offset row of dispensing apertures being a center row, or with each of the rows offset with respect to one another. The dispensing passageways also may be in the form of elongated slots inclined with respect to the longitudinal axis of the dispensing bar, with portions of adjacent slots overlapping in the direction of the bar longitudinal axis. The liquid medium retaining means at the opposite ends of the liquid medium reservoir may be in the form of screw-threaded plug members, with the support means at opposite ends of the bar comprising screw-threaded support rod-retaining members, with the support means at opposite ends of the bar comprising screw-threaded support rod-retaining members, and the bar may be formed of a suitable metal, such as stainless steel.

When dispensing the medium from the applicator it is important to maintain the exit openings of the dispensing passageways a prescribed distance from the medium surface in the container. This distance is determined by capillary action and surface tension of the liquid medium such that a continuous curtain of liquid is continuously maintained between the bottom of the applicator and the medium surface in the container or vat.

BRIEF DESCRIPTION OF THE DRAWINGS

FIG. 19 is a schematic front elevational view of a second embodiment of the invention;

FIG. 32 is an exploded, elevational view of the dispensing device shown in FIG. 31;

FIG. 33 is a bottom view of the dispensing device, as seen along the line 3—3 in FIG. 32;

FIG. 34 is an enlarged view of a portion of the bottom of the dispensing device shown in FIG. 33, as seen along the line 4—4 in FIG. 32;

FIG. 36 is a view similar to FIG. 34, illustrating a second embodiment of the invention; and FIG. 37 is a view similar to FIGS. 34 and 36, illustrating a third embodiment of the invention.

DETAILED DESCRIPTION OF THE EMBODIMENTS

Figure 1:
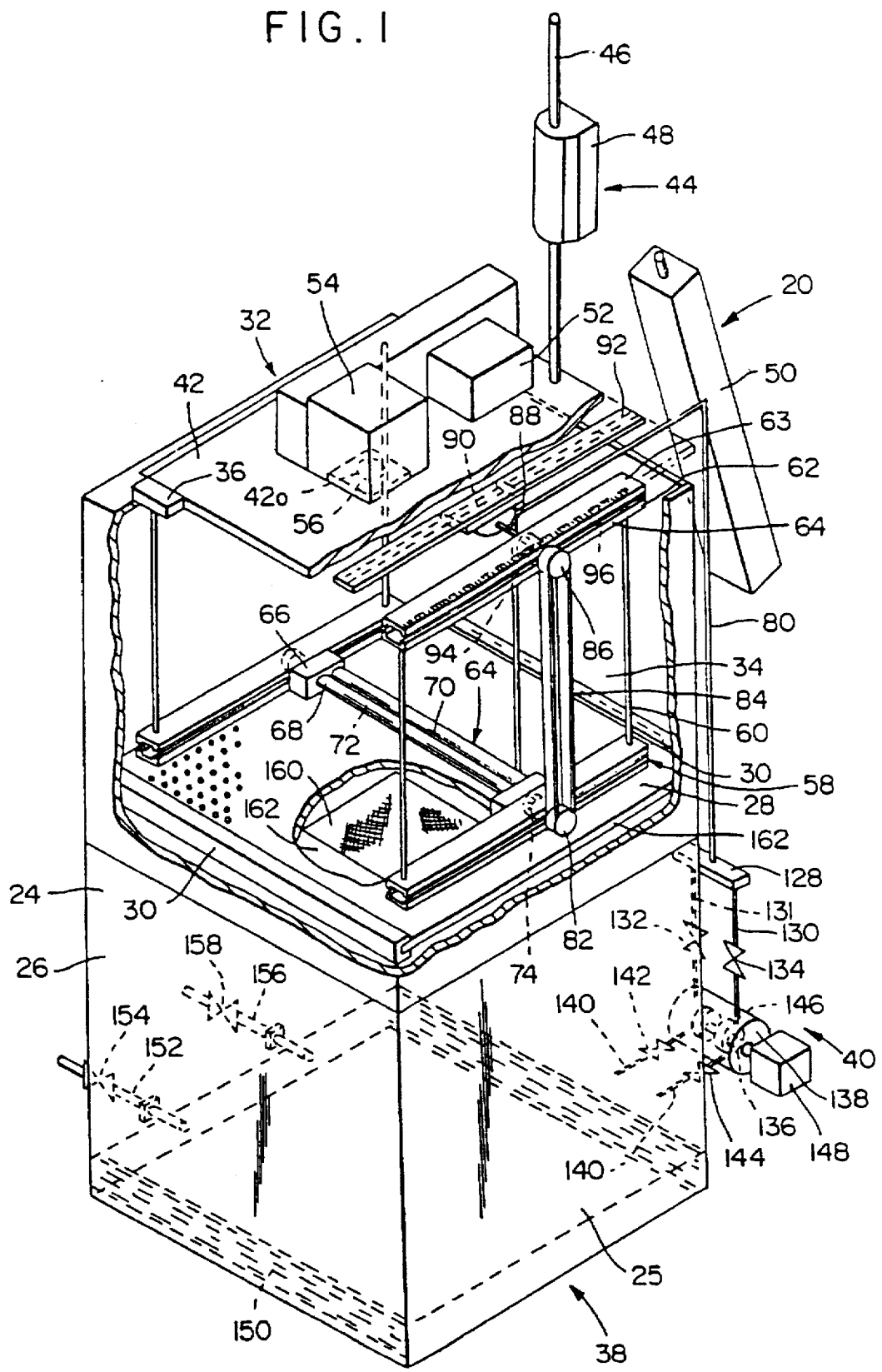
FIG. 1 is an isometric, schematic view of a first embodiment of an apparatus for forming a solid three-dimensional article from a liquid medium in accordance with the invention.
Figure 2:
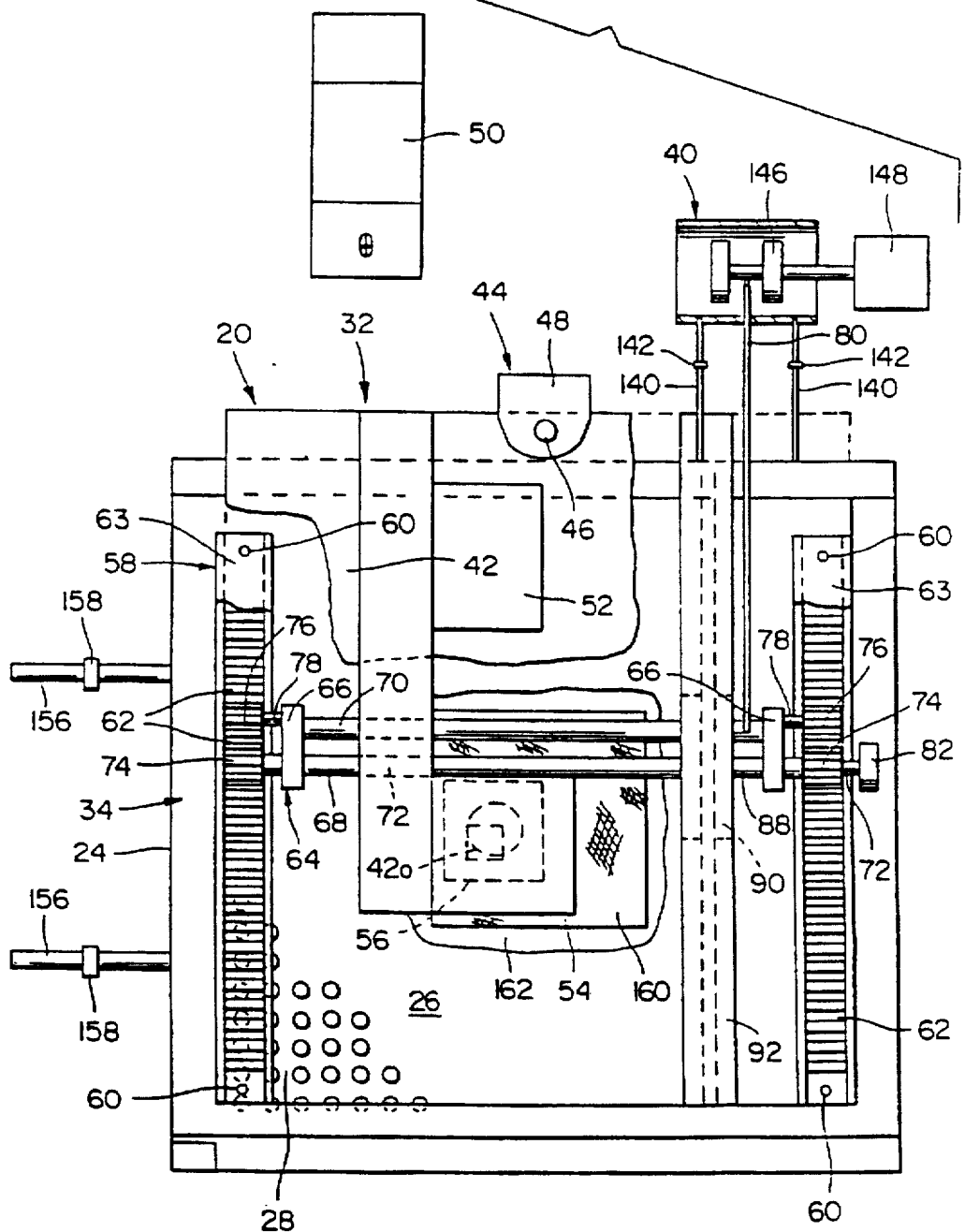
FIG. 2 is a plan view of the apparatus shown in FIG. 1, with certain parts omitted or partially broken away.
Figure 18A:
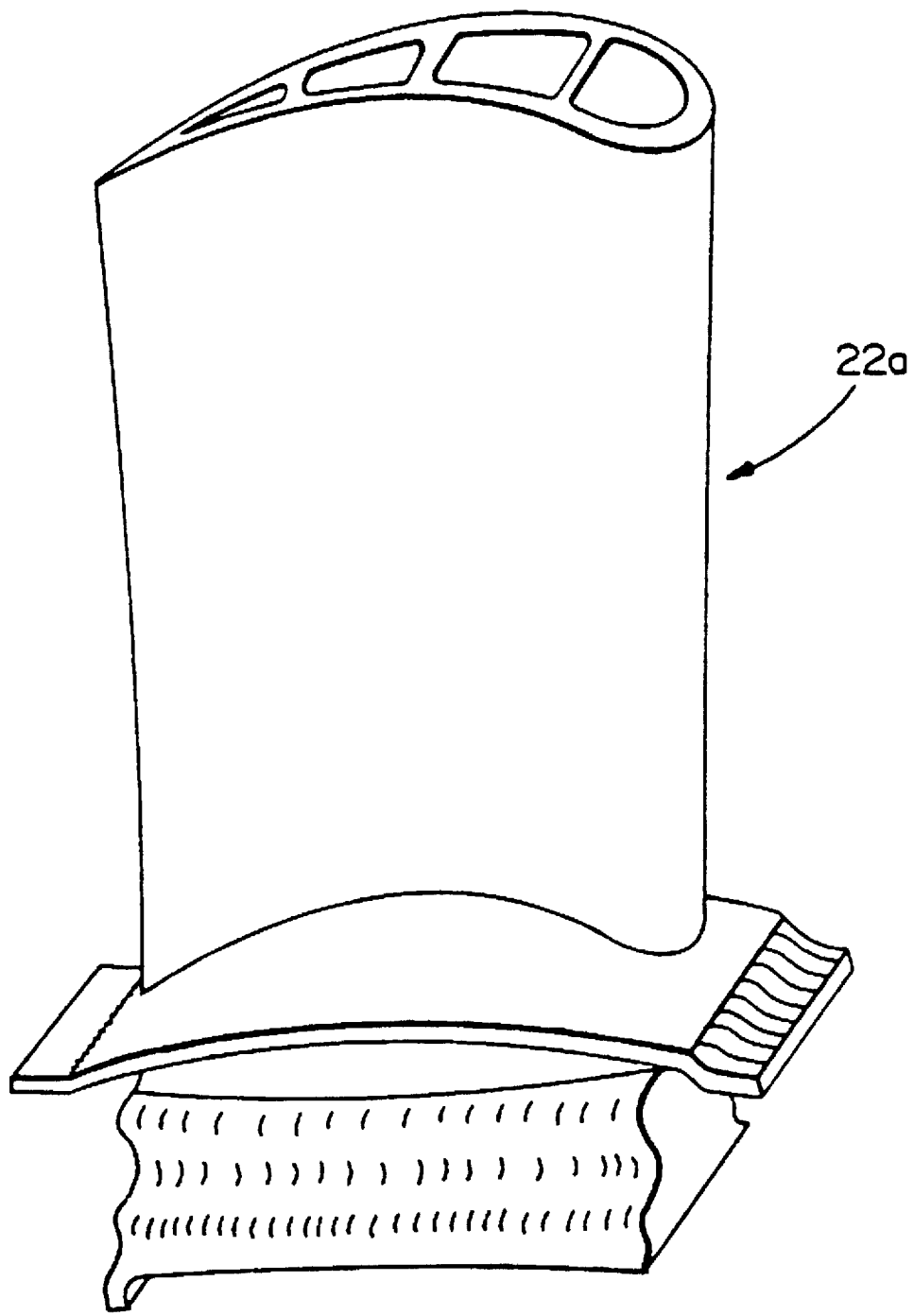
FIGS. 18A and 18B are isometric views of solid three-dimensional articles illustrating various types of shapes which may be formed utilizing the subject invention.
Figure 18B:
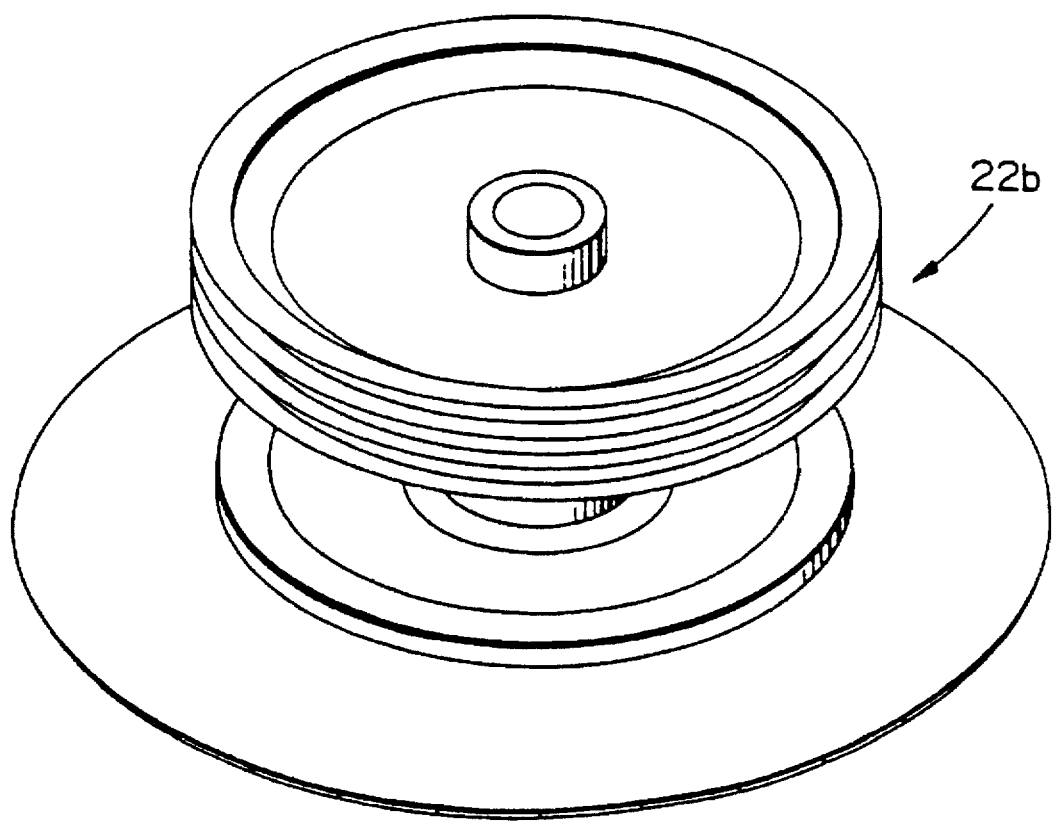

Referring to the embodiment of the invention shown in FIGS. 1 and 2, an apparatus 20 in accordance with the invention, for forming solid three-dimensional articles or parts, such as a turbine blade 22a, as illustrated in FIG. 18A, or a jet fuel swirler 22b, as illustrated in FIG. 18b, is disclosed. The apparatus 20 includes a container or tank 24, having a lower sump portion 25 (FIG. 1), for holding a liquid medium 26. The container 24 includes horizontally disposed apertured support plate member 28, for supporting the article 22 being formed during a forming operation. The support plate member 28 is removably mounted (through a door, not shown) in the container 24 in a fixed position against vertical movement, at an intermediate level, such as by having peripheral edge portions received in slotted guide members 30 (FIG. 1) fixed to the container interior walls. The apparatus 20 further includes a vertically movable energy scanning mechanism or system 32 for solidifying successive preselected cross-sections of the liquid medium 26, to form one of the articles 22. A liquid medium coating mechanism 34 and a liquid medium level sensor 36 (FIG. 1) of a laser beam-emitting type, which is responsive to reflected laser light from the surface of the liquid medium 26, are mounted on the vertically movable scanning mechanism 32. As is shown in FIG. 1, a liquid medium level raising mechanism 38 is provided in the bottom of the container 24, and a liquid medium withdrawal-and-feeding mechanism 40 also is provided adjacent the lower end of the container exteriorly thereof.

The vertically movable scanning mechanism 32 comprises a horizontal support plate 42 which is connected to a vertical traversing mechanism 44, such as a screw-threaded member 46 driven vertically by a reversible motor 48, for raising and lowering the scanning mechanism. A source of energy, such as a laser 50, a laser beam focusing optics system 52 and a scanner head 54, for directing the laser beam energy to solidify successive layers of the liquid medium 26, are all also mounted on the support plate 42 in a suitable manner. The horizontally disposed support plate 42 has an opening 42 formed therein beneath the scanner head 54, and is provided on its underside with a shutter 56 which is movable to an open position for a scanning operation, and movable to a closed position during the liquid medium coating operation, to prevent extraneous liquid medium from contaminating the optics system 52. For example, the shutter 56 may be secured to one end of a pivoted lever (not shown) pivotably connected at its opposite end to a solenoid (not shown) mounted beneath the support plate 42.

Referring to FIGS. 1 and 2, the liquid medium coating mechanism 34 may comprise a sub-frame 58 suspended beneath the horizontal plate 42. The sub-frame 58 includes a plurality of depending vertical legs 60 at each corner of the support plate 42, and horizontally disposed gear racks 62 and respective opposed guide members 63 connected between lower ends of respective ones of the vertical legs. The coating mechanism 34 further includes a coating carriage 64 of rectangular rigid construction, comprising opposite end plates 66, a drive shaft-enclosing tube 68 defining one longitudinal side of the carriage, and a liquid medium dispensing mechanism in the form of a spray tube 70 defining the opposite longitudinal side. The carriage 64 extends between the gear racks 62 and guide members 63 and further includes a drive shaft 72 journaled in the end plates 66 and having drive pinion gears 74 fixed thereto adjacent its opposite ends. The pinion gears 74 are disposed between respective ones of the opposed gear racks 62 and guide members 63, which thus guide the coating carriage 64 for horizontal movement therebetween. An idler pinion gear 76 (best shown in FIGS. 2 and 3) is rotatably mounted on a stub shaft 78 projecting from each end plate 66 and also is disposed between the adjacent gear racks 62 and guide members 63, to maintain the coating carriage 64 against rotation about the drive shaft 72, during the horizontal movement of the spray tube 70. The liquid medium 26 is fed into the spray tube 70 via a flexible line 80.

Figure 3:
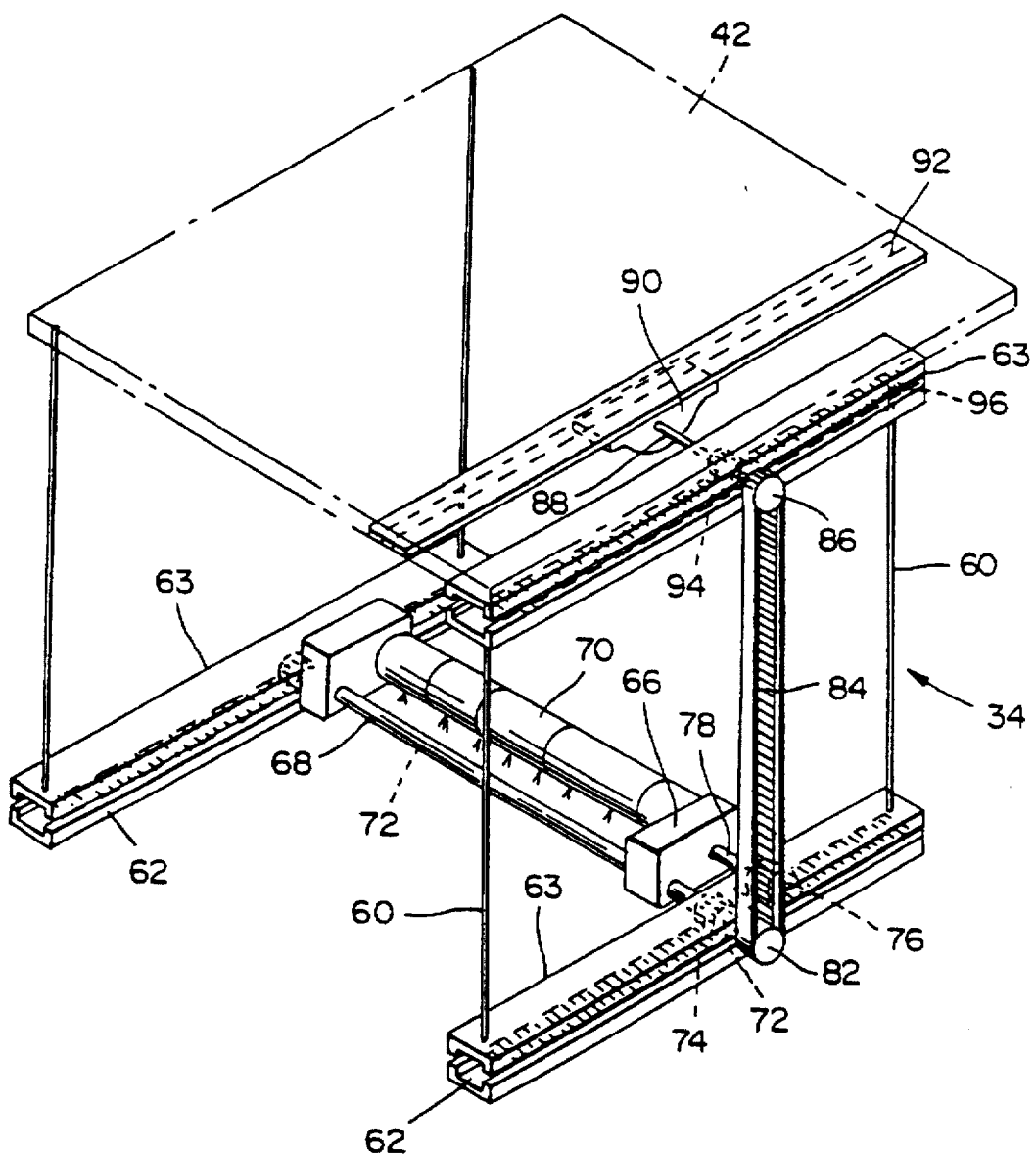
FIG. 3 is an enlarged isometric view of a coating mechanism of the apparatus shown in FIG. 1, for applying successive coatings of the liquid medium in the forming of the solid three-dimensional article.

As is best shown in FIG. 3, an extended portion of the drive shaft 72 has a drive pulley 82 fixed thereto and connected by a timing belt 84 to a pulley 86 secured to a drive shaft 86 of a small reversible motor 90 mounted for sliding movement on a dovetail guide 92 secured to the underside of the horizontally disposed support plate 42. The drive shaft 88 of the motor 90 also has a pinion gear 94 secured thereon and engageable with a horizontally disposed gear rack 96 extending between and fixedly connected to adjacent ones of the vertical legs 60 below the horizontal plate member 42. Accordingly, during a liquid medium coating operation, rotation of the motor 90 causes it to drive itself along its guide 92 by engagement of its drive pinion gear 94 with the gear rack 96, while at the same time, causing the coating carriage 64 to be driven along the lower gear racks 62 by means of the timing belt 84, and the pulley 82 and pinion gears 74 on the coating carriage 64.

Figure 4:
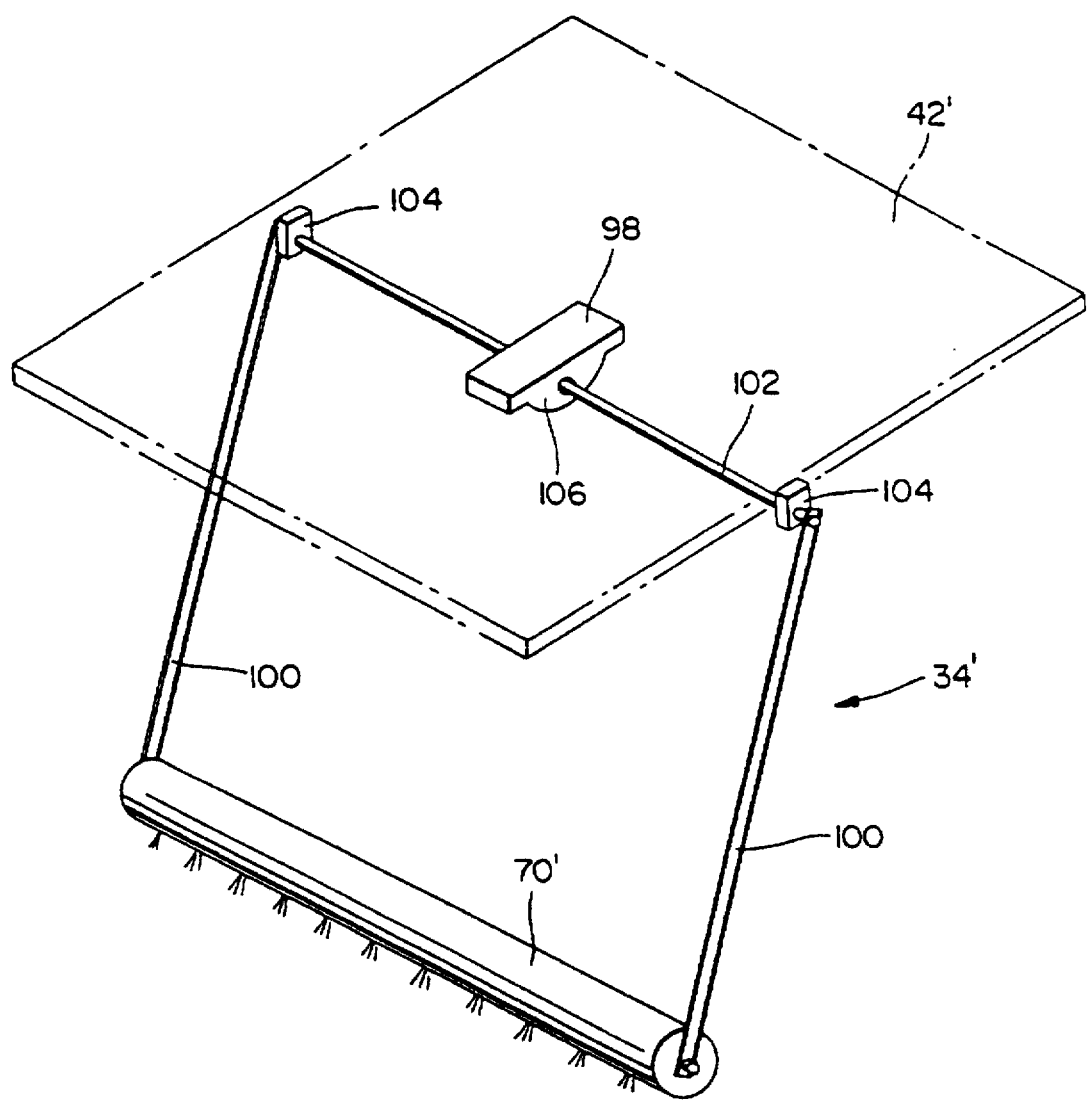
FIG. 4 is an isometric view, similar to FIG. 1, showing an alternate form of coating mechanism to that shown in FIGS. 1–3.

FIG. 4 discloses an alternative embodiment of the coating mechanism of the invention in which a cylindrical spray tube 70' off a coating mechanism 34' is mounted beneath a horizontal support plate 42' by a pendulum-type oscillating mounting 98. In this embodiment, opposite ends of the spray tube 70' are secured to a pair of horizontally spaced vertically depending legs 100 secured at their upper ends to a horizontal rotatable shaft 102 mounted in suitable bearings 104 secured to the underside of the horizontal support plate 42'. The rotatable shaft 102 forms a drive shaft of a small reversible motor 106 fixedly mounted on the underside of the horizontal support plate 42'. Thus, by operating the motor 106 through a preselected angle, such as 40°, the spray tube 70' can be moved along an arc for spraying liquid medium 26 toward an apertured article support plate (not shown in FIG. 4) in a liquid medium-coating operation.

Figure 5A:
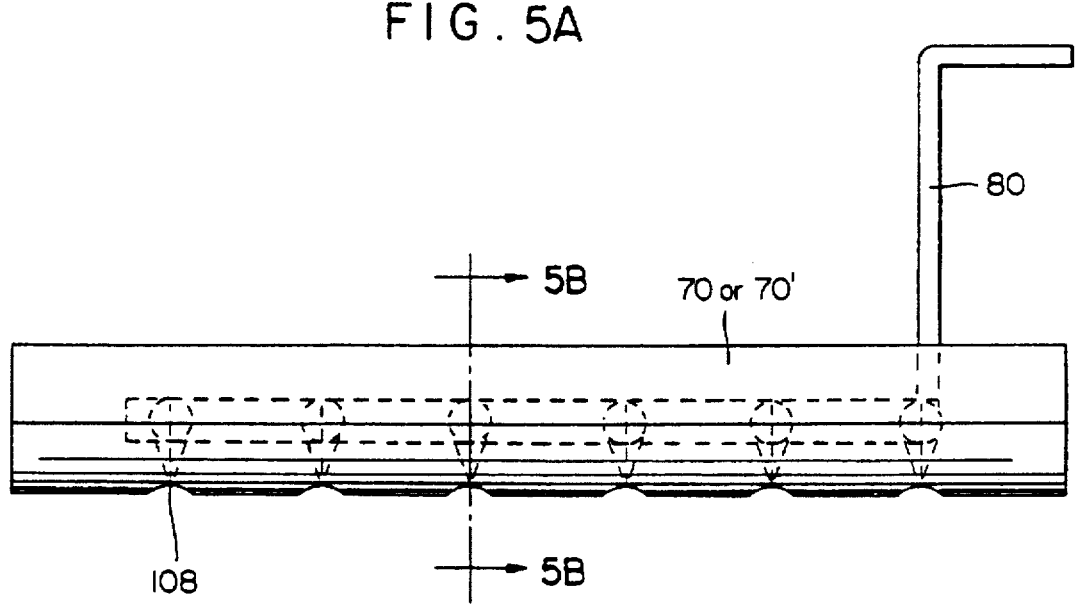
FIG. 5A is an enlarged, schematic, partial view of an apertured spray tube-type coating mechanism as shown in FIG. 3.
Figure 5B:
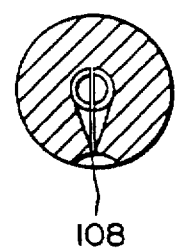
FIG. 5B is a cross-sectional view taken along the lines 58—58 in FIG. 5A.
Figure 6:
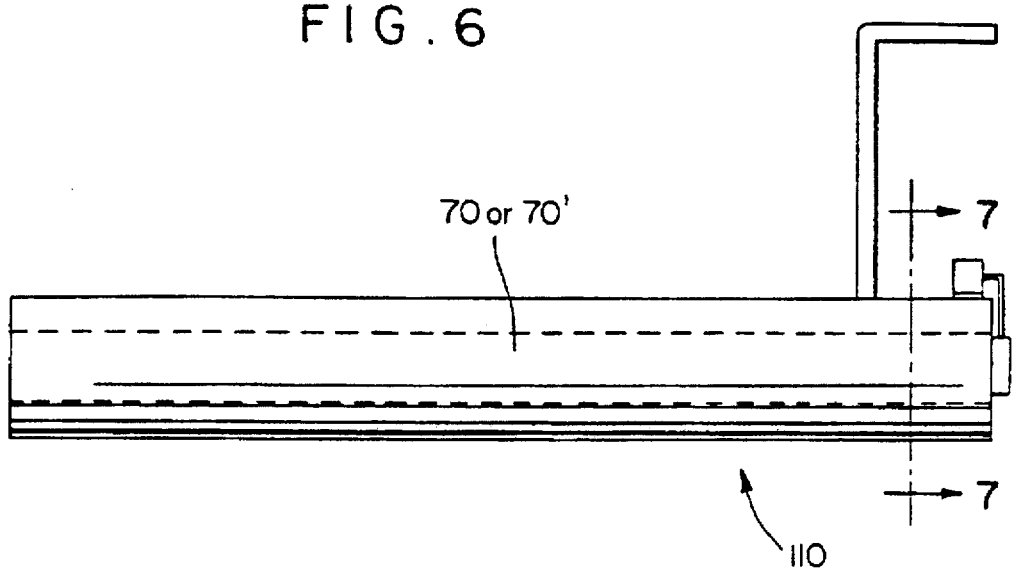
FIG. 6 is an enlarged, schematic, partial view of a slot-type coating mechanism.
Figure 7A:
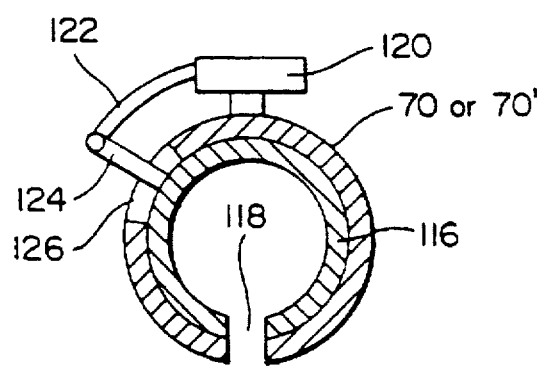
FIGS. 7A and 7B are schematic cross-sectional views taken along the line 7—7 in FIG. 6 showing different operating conditions.
Figure 7B:
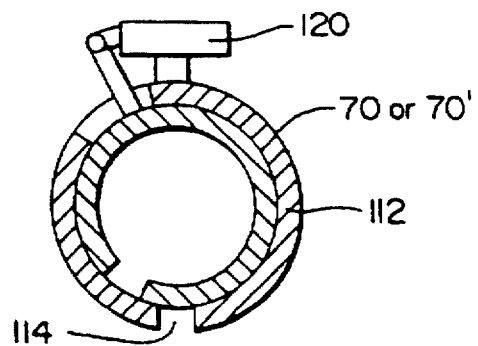

As is illustrated in FIGS. 5A and 5B, each of the spray tubes 70 or 70' may include a row of spraying apertures 108 extending along a lower portion thereof, with the liquid medium flexible inlet tube 80 connected to the spray tube adjacent one end thereof. In the alternative, referring to FIGS. 6, 7A and 7B, each of the spray tubes 70 or 70' may be in the form of a cylinder assembly 110 comprising an outer cylinder 112 provided with an elongated slot 114, and an inner cylinder 116 also provided with an elongated slot 118. The inner cylinder 116 is rotatable relative to the outer cylinder 112 between a position in which the elongated slots 114 and 118 in the cylinders are aligned, as shown in FIG. 7A, for a spraying operation, and a relative position in which the slots are in a non-aligned closed position, as shown in FIG. 7B. For this purpose, a small solenoid 120 is fixedly mounted on the outer cylinder 112 and has an arc-shaped plunger 122 pivotally connected to an outer end of a lug 124 secured at its inner end to the inner cylinder 116, with the lug disposed for limited circumferential movement in a circumferentially extending slot 126 in the outer cylinder.

Referring again to FIG. 1, the liquid medium 26 for a liquid medium coating operation is provided to the spray tube 70 by the liquid medium withdrawing-and-feeding mechanism 40. For this purpose, as is illustrated by the spray tube inlet line 80, the inlet line is connected to a manifold 128, in turn connected by feed lines 130 and 131 and respective control valves 132 and 134 to a double acting piston-and-cylinder mechanism 136. A cylinder 138 of the double acting piston-and-cylinder mechanism 136 is connected by additional feed lines 140, through control valves 142 and 144, to the liquid medium sump portion 25 adjacent the bottom of the liquid medium container 24. A double acting piston 146 of the piston-and-cylinder mechanism 136 is reciprocated by a solenoid 148, so that, upon selective operation of the valves 132, 134, 142 and 144, when the piston is moved in one direction (e.g., to the left in FIG. 1) with the valves 132 and 144 open and the valves 134 and 142 closed, the liquid medium 26 in the cylinder 138 will be forced from the cylinder through the valve 132, the feed line 131, the manifold 128 and the inlet tube 80 to the spray tube 70. At the same time, with the valve 144 open and the valve 134 closed, additional liquid medium 26 will be withdrawn from the sump portion of the container 24 into the opposite end of the cylinder 138. Then, upon a next liquid medium coating operation, when the solenoid 148 is operated to move the piston 136 in the opposite direction (i.e., to the right in FIG. 1), with the valves 134 and 142 open and the valves 132 and 144 closed, the liquid medium 26 which was withdrawn into the cylinder 138 on the previous coating operation, will be fed from the cylinder through the valve 134, the feed line 130, the manifold 128 and the inlet tube 80, to the spray tube 70.

With further reference to FIG. 1, the liquid level raising mechanism 38 comprises an expandable member, such as a bellows 150, disposed in the bottom of the liquid medium container 24. One end of the bellows 150 is connected by an inlet line 152 extending through a lower wall portion of the container 24, and a control valve 154, to a fluid pressure source, such as air or water, not shown. Accordingly, when the control valve 154 is opened, the bellows 150 is expanded by the fluid pressure an incremental amount in order to raise the level of the liquid medium 26 in the container 24 a corresponding incremental amount (e.g., 0.0017" to 0.020") above the upper surface of the apertured article support plate 28 in the container for an article layer forming operation. For this purpose, the liquid medium level sensor 36 on the vertically movable scanning mechanism 32, operates when the desired liquid medium incremental level above the surface of the support plate 28 has been reached, to cause closing of the bellows control valve 154. This expansion of the bellows 150 is repeated for subsequent article layer forming operations until forming of the article 22 has been completed and the upper surface of the bellows has reached an upper level. A drain line 156 with a valve 158, which also is connected to the bellows 150, then may be opened to drain the expansion fluid therefrom, whereupon the bellows returns to its original un-expanded condition, as shown in solid lines in FIG. 1, and the liquid medium 26 in the container 24 is returned to its original lower position. During this liquid level returning operation, any extraneous solidified material in the article-forming upper portion of the container 24 is removed by a filter 160 disposed in a horizontal plate 162 secured to the interior walls of the container.

Figure 8:
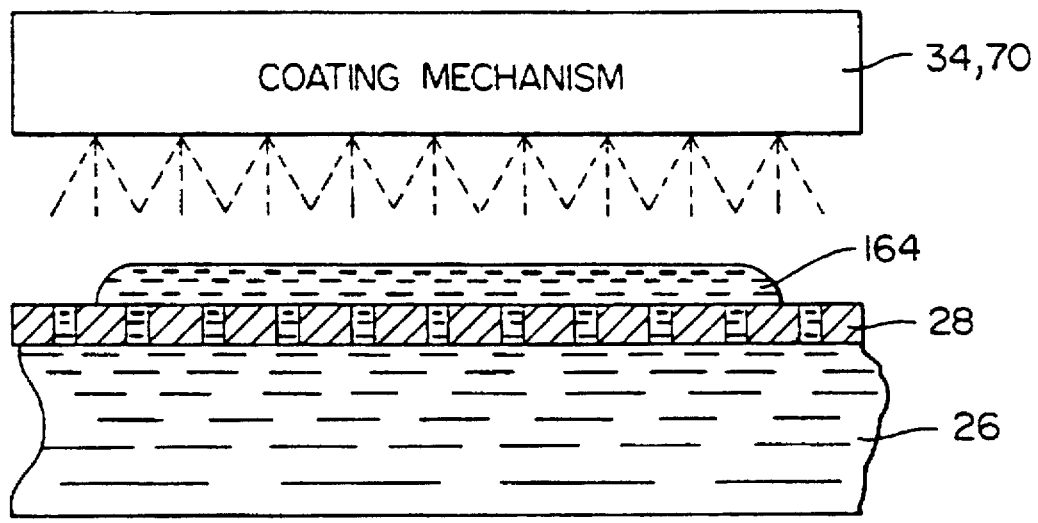
FIGS. 8 through 13 are elevational schematic views illustrating a sequence of steps in the forming of the solid three dimensional article, in accordance with the first embodiment of the invention.
Figure 9:
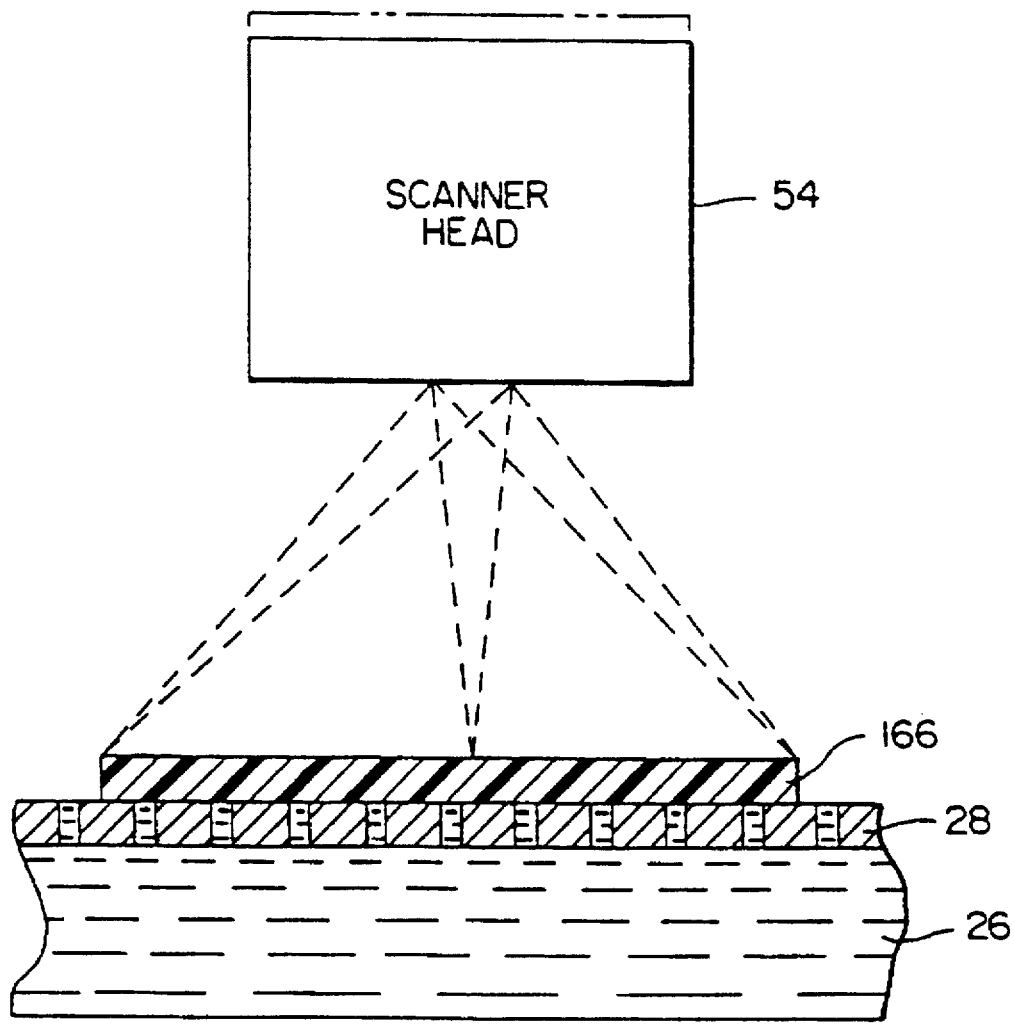
Figure 12:
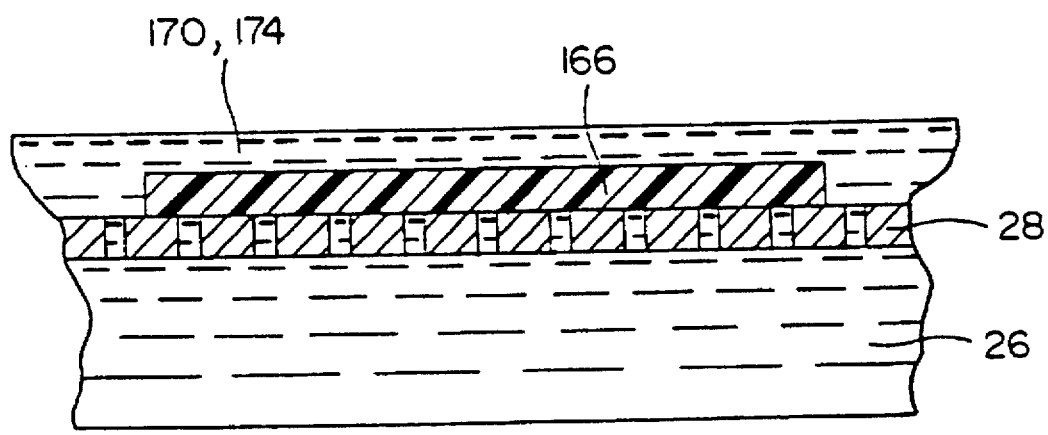
Figure 13:
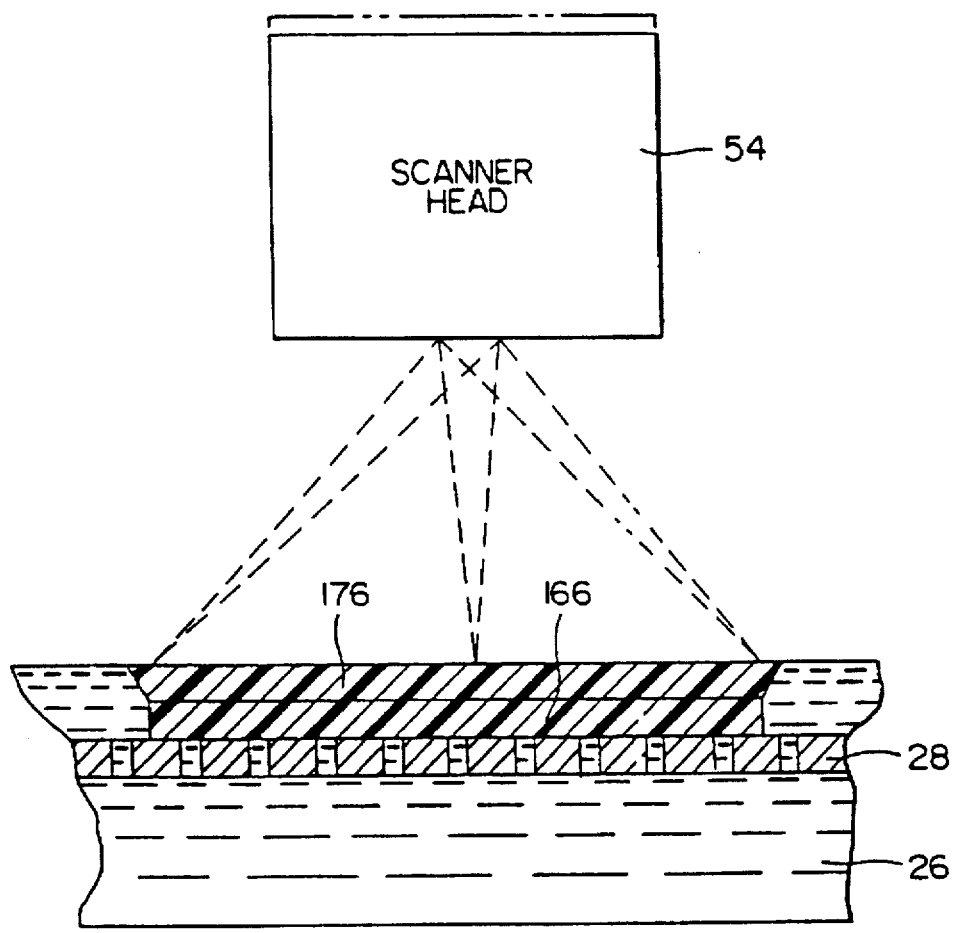
Figure 14:
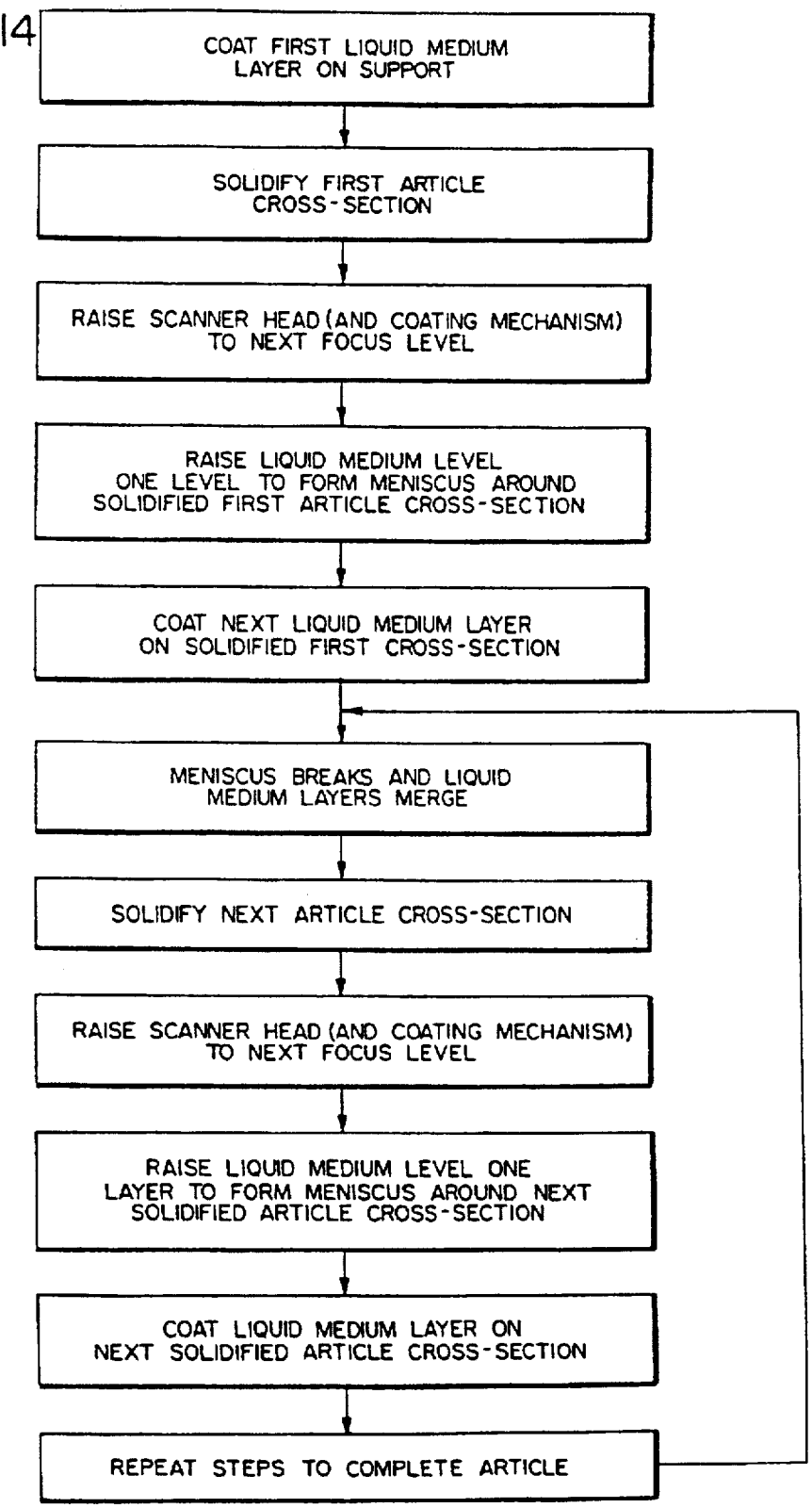
FIG. 14 is a block diagram further illustrating the sequence of steps shown in FIGS. 8 through 13.
Figure 16:
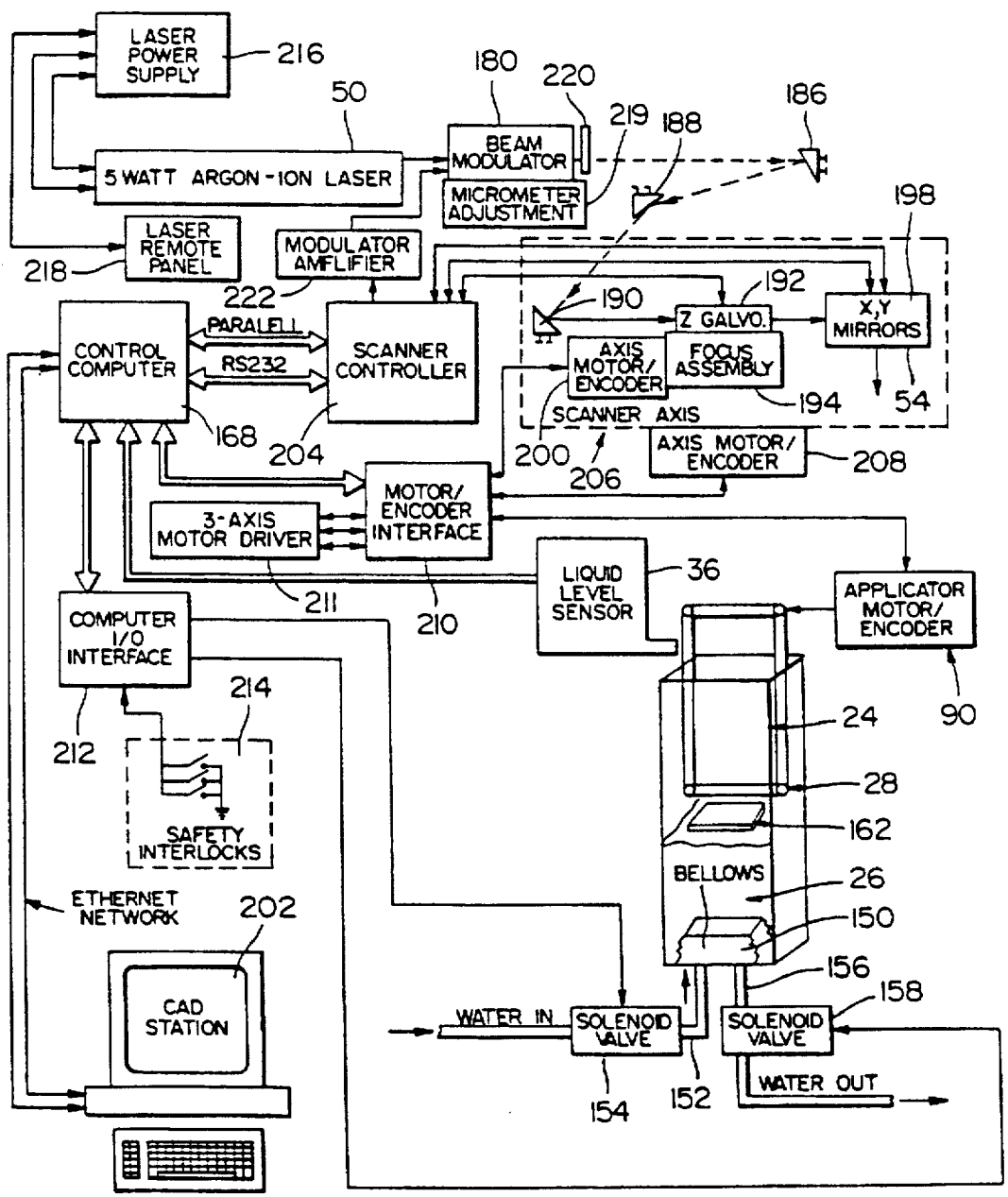
FIG. 16 is a block diagram of a system for carrying out the invention.

FIGS. 8–13 are schematic illustrations depicting a series of steps in carrying out the method of the invention, and FIG. 14 is a block diagram summarizing the steps illustrated in FIGS. 8–13. With reference to FIG. 8, initially, a first layer 164 of the liquid medium 26 is applied to the apertured fixed support plate 28 in the container 24 from above the fixed support plate, by way of example, by spraying from the spray-coating tube 70. Referring to FIG. 9, a preselected cross-section or profile 166 of the initial liquid medium layer 164, in accordance with a design of the solid three-dimensional article being formed, then is solidified by the scanner head 54 applying the laser beam energy from the laser 50 to the liquid medium layer under the direction of a computer 168 (FIG. 16). After the preselected cross-section 166 of the liquid medium layer 164 has been solidified, the scanning mechanism 32, including the scanner head 54-coating mechanism 34, is moved vertically an increment corresponding to the thickness of the next layer to be solidified, (e.g., 0.0017" to 0.020") as illustrated by the phantom line in FIG. 9.

Figure 10:
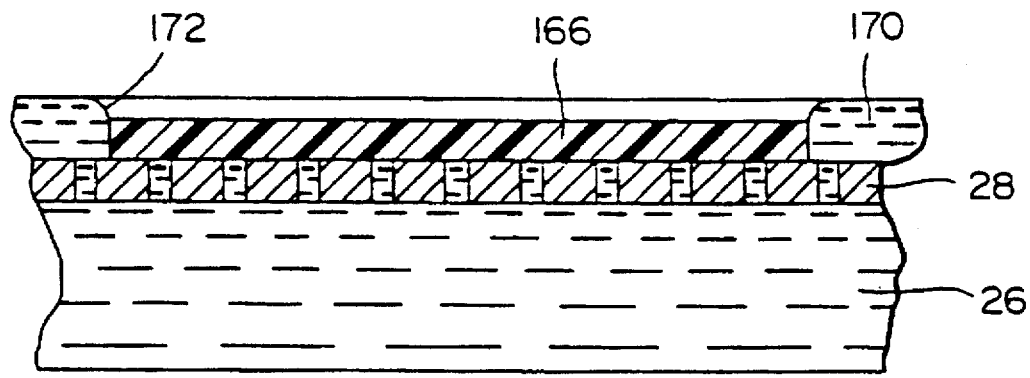
Figure 11:
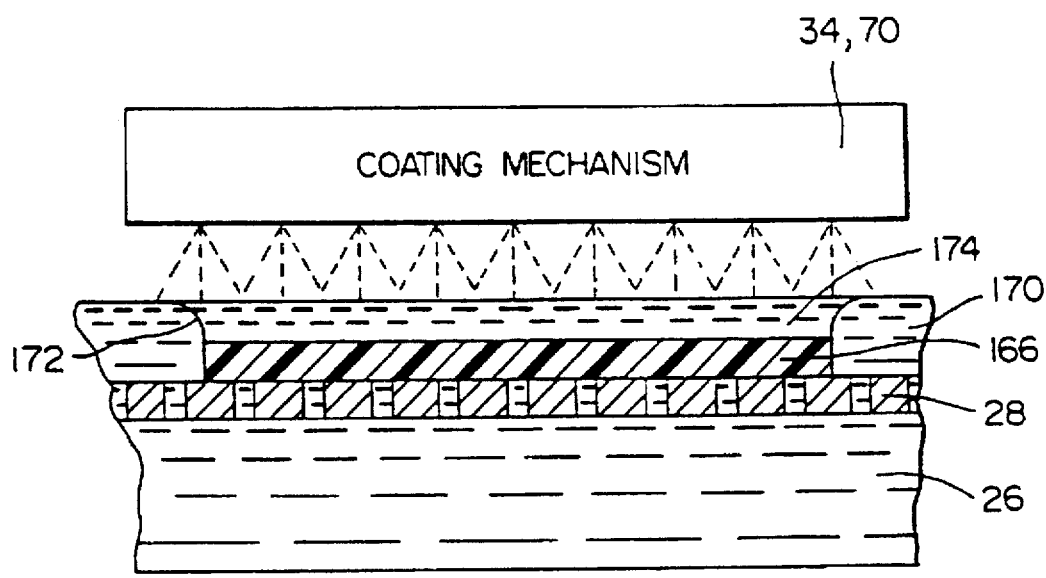

Referring to FIGS. 1 and 10, the fluid inlet valve 154 (FIG. 1) to the bellows 150 then is opened under the direction of the computer 168, to cause an initial incremental expansion of the bellows, to raise the level of the liquid medium 26 in the container 24 upward through the apertures in the article support plate 28, the preselected increment (e.g., 0.0017" to 0.020") above the previously solidified article cross-section 166, so that the surface tension of the thus-formed elevated layer 170 of the liquid medium 26 forms a meniscus 172 around the perimeter of the previously solidified article cross-section, without the liquid medium flowing over the upper surface of the solidified cross-section. Referring to FIG. 11, the upper surface of the initial solidified cross-section 166 of the article then is spray-coated by the spray tube 70 from above the fixed support 28 in the container 24, to fill the recess formed by the meniscus 172 above the upper surface of the solidified article cross-section, with an additional layer 174 of the liquid medium 26. The spraying operation causes the meniscus 172 surrounding the article cross-section 166 to break, whereby the layers 170 and 174 of liquid medium 26 merge, as illustrated in FIG. 12, thus completing the raising of the liquid level in the container 24 by a one-layer increment. With reference to FIG. 13, the scanner head 54 then is again operated to solidify another preselected cross-section or profile 176 of the article 22 being formed, under the direction of the computer 168, to form the next layer of the article. The liquid medium level raising step, liquid medium coating-and-meniscus breaking step, liquid medium solidifying step and scanner head-coating mechanism raising step, as represented by the steps 4, 5, 6, 7 and 8, and depicted in FIGS. 10, 11, 12 and 13, then are repeated, as necessary, until formation of the article 22 is completed.

Figure 5C:
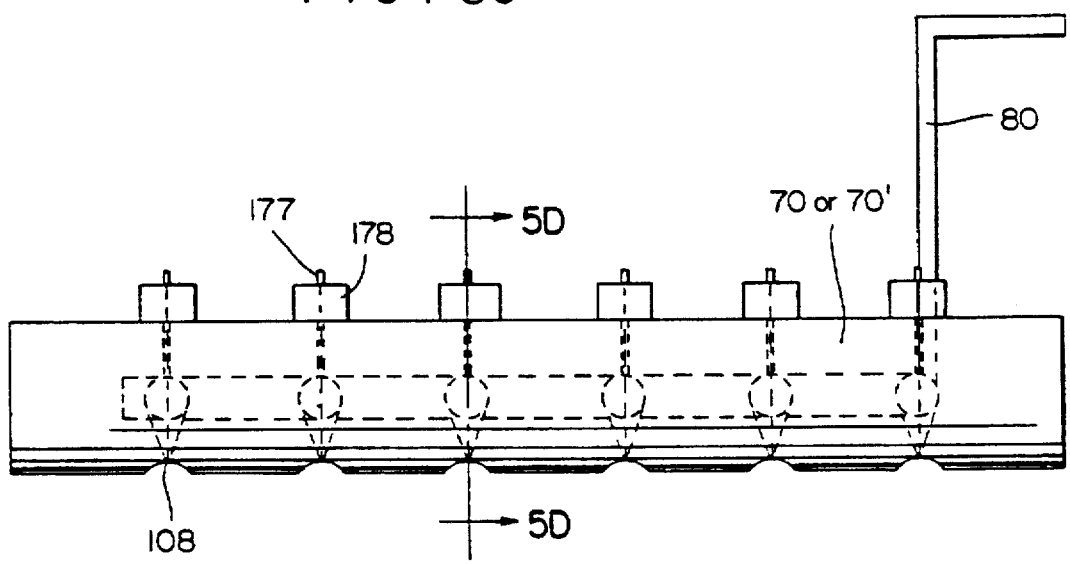
FIG. 5C is an enlarged, schematic, partial view of an alternate spray tube construction.
Figure 5D:
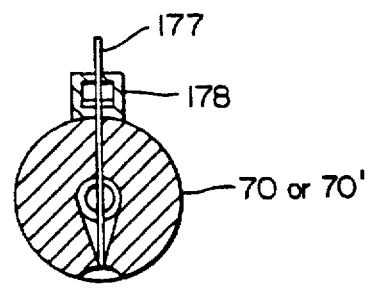
FIG. 5D is a cross-sectional view taken along the line 5D—5D in FIG. 5C.

In coating each of the solidified layers 166 and 176 of the liquid medium 26, it has been found that overspray of the liquid medium beyond the meniscus 172 onto the existing liquid medium, generally does not appear to produce a significant tolerance error in the finished article 22. While the reasons for this are not fully understood, it is believed to be due, at least in part, to the thinness of the liquid medium layers 166 and 176 involved. However, where tolerance variations are found to be a problem in any particular instance, a modified spray tube, as shown in FIGS. 5C and 5D may be used. In this embodiment, each spray aperture 108 is provided with a separate control pin 177 operated by a solenoid 178. Thus, by programming the computer 168 to control the solenoids 178 so that the spray tube 70 or 70' begins spraying only at one extreme end portion of a meniscus, sprays only those areas within the confines of the meniscus during travel of the spray tube, and stops spraying at an opposite extreme end portion of the meniscus, closer tolerances can be obtained. The coating tube 70 or 70' of FIGS. 6, 7A and 7B may be used in a similar manner by dividing the inner cylinder 116 into relatively movable sections and providing each section with a respective control solenoid 120.

Figure 15:
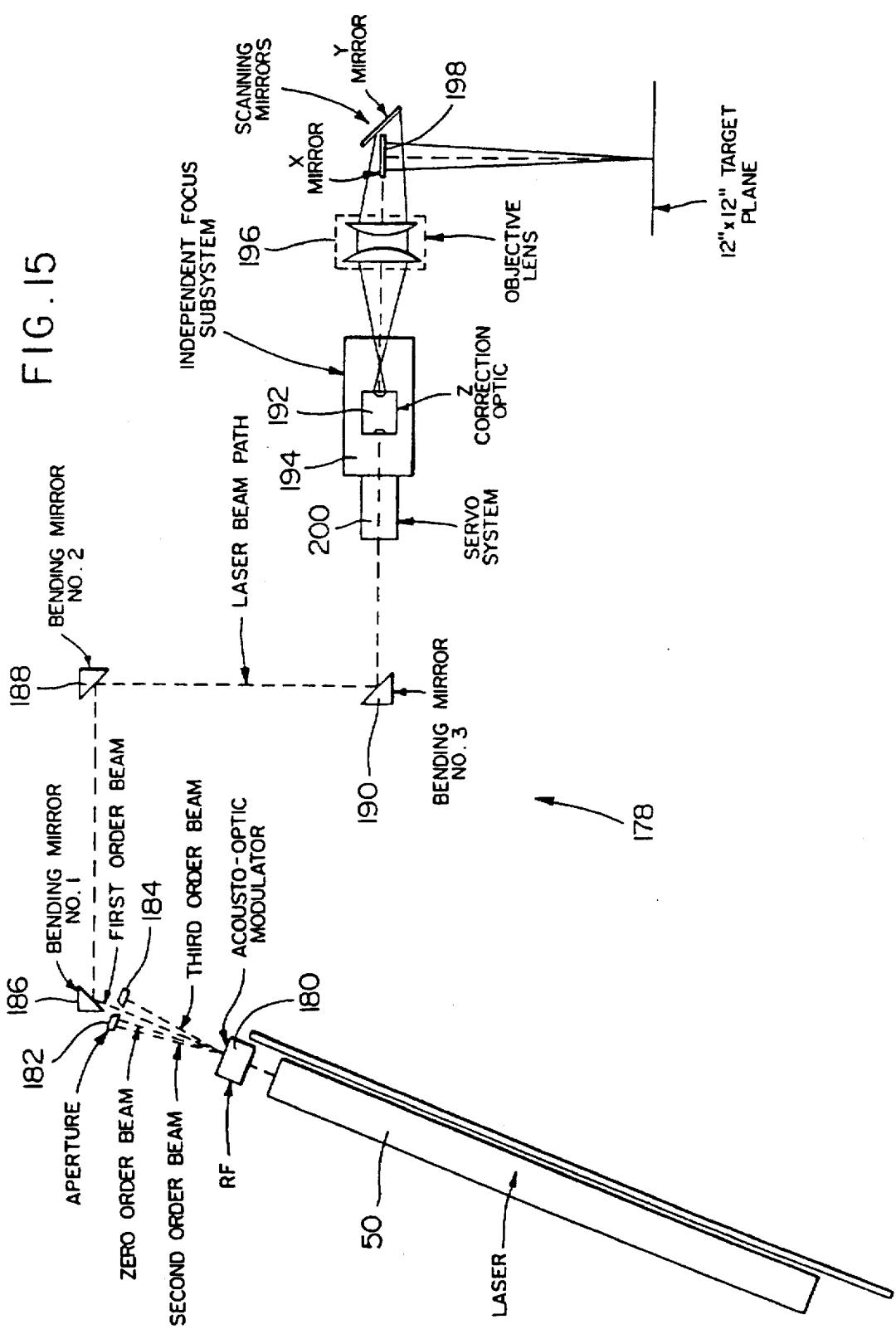
FIG. 15 is a schematic illustration of an optics system which may be used in practicing the invention.

FIG. 15 discloses an optic system 178 which may be used in practicing the invention. The laser is beam of the laser 50 is directed through an RF acousto-optic beam modulator 180 in the form of a rotatable piezoelectric crystal which splits the beam into several orders of magnitude and which can be used as a beam shutter in a known manner. More specifically, when the modulator 180 is de-energized, the laser beam of the laser 50, which may pass from the modulator through a suitable bending mirror (not shown), strikes a portion of a blocking member 184 in a manner not illustrated. When the modulator 180 then is energized by an RF signal from an RF generator (not shown), the crystal splits the beam into several orders of magnitude, the zero, second and third orders of which still strike the blocking member 184, as illustrated in FIG. 15. However, having an intensity on the order of 85% of the laser output, then passes through an aperture 182 in the blocking member 184 to a series of three (or more) bending mirrors 186, 188 and 190, and through an adjustably movable Z-axis correction focusing lens 192 on a reciprocal carriage 194, and an objective lens 196, to X and Y scanning mirrors 198 of the scanner head 54, which direct the beam so that it scans across the layer of liquid medium to be solidified. For this purpose, the correction lens 192 is focused so that a preselected diameter of the laser beam impinges upon the liquid medium layer, and the computer 168 is programmed to vary the position off the carriage 194, and thus the focusing lens 192, by a suitable servosystem (axis motor/encoder) 200, "on the fly", during the solidification operation, so that the impinging diameter of the laser beam remains constant as the beam is directed toward the liquid medium at a direction other than perpendicular, as for example, disclosed in U.S. Pat. Nos. 4,797,749 and 4,816,920 of O. R. Paulsen, and assigned to General Scanning, Inc., of Watertown Mass.

Referring to the block diagram of FIG. 16, it is seen that apparatus for practicing the invention includes a CAD station 202 which is connected by an ETHERNET network to the control computer 168 in a known manner. The computer 168 is connected through a scanner controller 204 to a scanner head access system 206 including an axis motor/encoder 208, the Z-axis galvanometer 192, the X and Y mirrors 198 of the scanner head 54, and the focusing assembly 194. The computer 168 is also connected to the applicator motor/encoder 90, for the liquid medium applicator (coater mechanism) 34, through a motor/encoder interface 210 having a 3-axis motor driver 211 connected thereto, and is also connected to the focus servosystem (axis motor/encoder) 200, and scanner axis motor/encoder 208. The solenoid valve 154 for controlling fluid input to the bellows 150, and the drain valve 158 for the bellows, also are controlled by the computer 168 through a computer I/O interface 212, with safety interlocks 214 (e.g., open door, etc.) also connected to the computer 168 through the computer I/O interface.

With further reference to FIG. 16, the laser 50 is connected to an associated power supply 216, in turn connected to a control panel 218 in a known manner. The beam of the laser 50 is directed therefrom to the beam modulator 180 having a linear and rotary micrometer adjustment system 219 and a mechanical safety shutter 220. The micrometer adjustment system 219 of the beam modulator 180 is utilized to select and direct the first order portion of the laser beam to the first bending mirror 186, as shown in FIG. 15 and previously described, from which the laser beam passes to the second and third bending mirrors 188 and 190, and then to the Z-axis galvanometer 192 of the focusing assembly 194, and to the scanner head X, Y mirrors 198 for a scanning (liquid medium solidifying) operation. The laser beam modulator 180 also is connected to a modulator amplifier 222 which receives signals from the scanner controller 204.

The control equipment as disclosed in FIG. 16 is of a type which is generally known in the art. For example, the computer 168 may be the model "Smart Micro 386/120" or "SMART MICRO 486/120" available from Microsmart, Inc. of Ashland, Mass. The CAD station 202, SPARKSTATION® may be obtained from Sun Microsystems of Mountain View Calif., and software may be obtained from Structure Dynamics Research Corporation of Cincinnati, Ohio as their "Ideas for Design". Similarly, the laser 50 may be the 5 watt argon-ion laser sold by Coherent, Inc. of Mountain View, Calif. as their model "I-70" (a visible light laser); the scanner head 54 may be obtained from General Scanning, Inc. of Watertown, Mass.; the laser sensor 36, "LASERNET®," may be that sold by Namco Controls of Mentor, Ohio; and the RF beam modulator 189 may be the Model No. N30085-30 available from Newport Electro-Optics Systems of Melbourne, Fla.

The liquid medium 26 may be of any suitable type capable of being solidified when subjected to energy, such as a laser beam. For example, the liquid medium may be a UV polymer acrolite thermoset photosensitive plastic resin, such as "DESOLITE®," available from DSM Desotech, Inc. (formerly DeSoto, Inc.) of Chicago, Ill., or a suitable ceramic liquid. However, it has been found preferable to use as the liquid medium a polymer resin sensitive to visible laser light (e.g., 400 to 700 nm), which is also available from DSM Desotech Inc. as their composition No.4057-16. The use of a visible light photohardenable polymer in combination with a visible light laser provides significant advantages over other systems, for example, employing a UV light laser. The reason for this is believed to be that visible light lasers generally provide more energy and thus are able to achieve better solidification and definition in the hardened layer, more quickly. Other suitable materials, however, may also be apparent to those skilled in the art.

Figure 17:
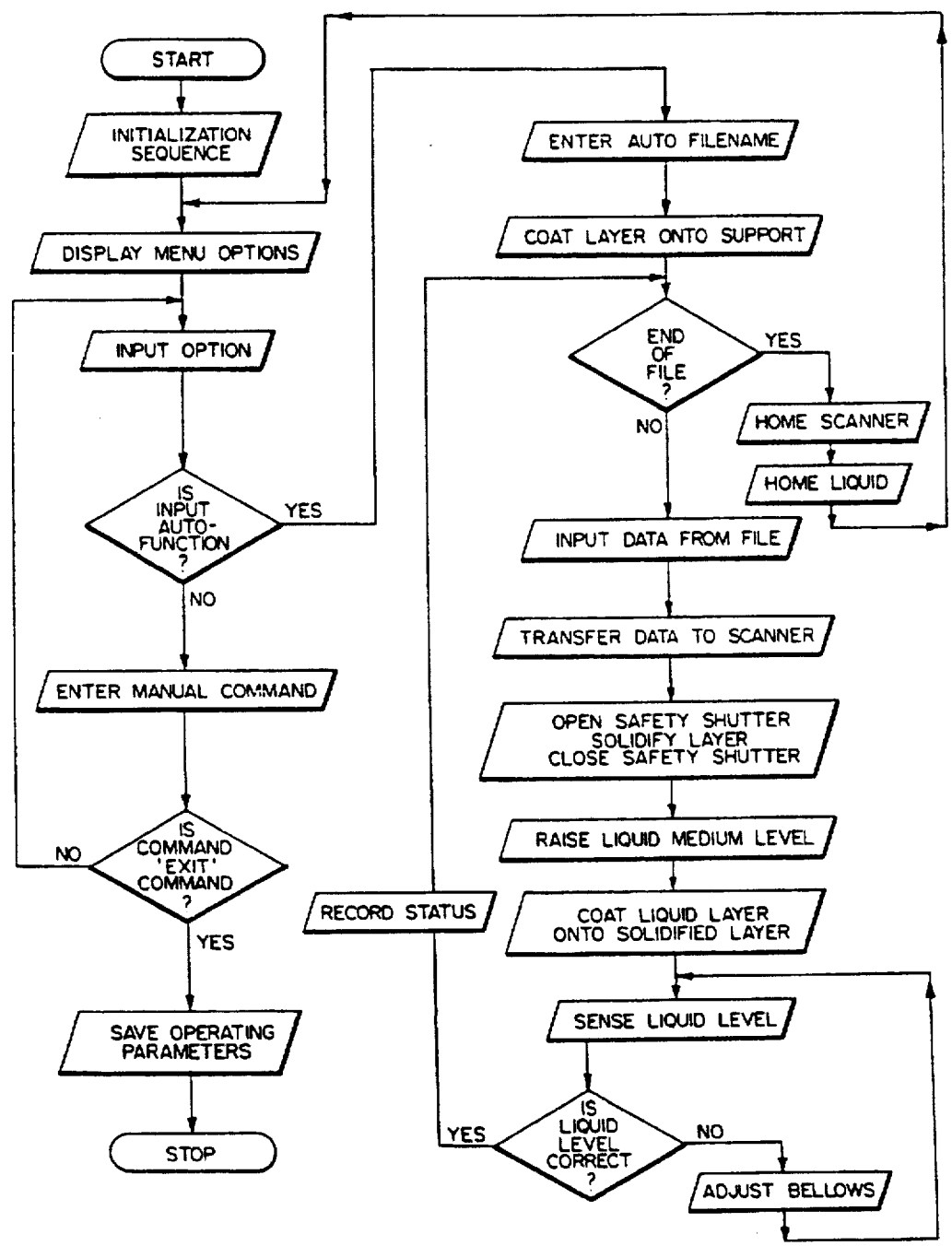
FIG. 17 is a flow chart illustrating a sequence of programming steps utilized in carrying out the first embodiment of the invention.

FIG. 17 is a flow chart of a sequence of operations of the apparatus 20 in accordance with the invention, in the forming of a solid three-dimensional article 22 from the liquid medium 26. At the beginning of a forming operation, the apparatus 20 proceeds through an initialization sequence, in which the computer 168 determines the then-existing position settings of the various units of the apparatus, applies power to all units, returns the units to their "home" positions, and calibrates the scanner system 32. (In the alternative, the units may be returned to their "home" positions manually by operation of a key on a keyboard (not shown) of the computer 168.) The computer 168 then displays the various available menu options and the operator selects one of the options. If the input option is not automatic, the operator then executes the desired manual command, such as "jog the scanner head up", whereupon, unless the command is an "exit" command, the computer 168 displays another input option for selection by the operator. If the command is an "exit" command, the computer 168 stores the positions of the various units of the system for the next operation, and the apparatus 20 is turned off.

If the input option selected by the operator is automatic, the computer 168 enters an automatic file name (g., the name of an article 22 to be formed) for processing. If the next cross-section or profile of the article 22 to be formed is other than the last cross-section, that is, the end of the file, the computer 168 then inputs information for the cross-section to be formed, and transfers the data to the scanning system 32. If a layer of the liquid medium 26 has been coated in a solidifying operation, the safety shutter 56 beneath the horizontal plate of scanning system 32 is opened and the cross-section of the article to be formed is scanned and solidified by the scanning system. After solidification of the cross-section has been completed and the safety shutter 56 has been closed, the scanning system 32 is raised one increment by the lift mechanism 44, and the bellows 150 is operated to expand an additional increment to raise the liquid medium level a desired amount, as sensed by the liquid medium level sensor 36, to form a meniscus 172 around the just-solidified profile as illustrated in FIG. 10. If the liquid medium level sensor 36 does not operate, the bellows 150 is again operated an additional increment until operation of the liquid medium sensor occurs. The status of the forming operation, i.e., that the cross-section has been formed and that the system is ready to form the next cross-section, then is recorded in the computer 168, and the sequence of operations is repeated.

However, if the computer 168 determines that the last sequence of operations was the last cross-section for the article 22 being formed, i.e., the end of the file, the scanner system 32 is raised upward to its upper "home" position by the lift mechanism 44, and the drain valve 158 of the bellows 150 is opened by the computer 168 to permit the liquid medium 26 in the container 24 to be lowered to its "home" position, to permit access to the completed article 22 and removal thereof from the apertured support plate 28 in the container 24, as well as removal and/or cleaning of the support plate for the next article forming operation. The removed article 22, while of relatively rigid construction, then is subjected to final curing under one or more lamps at a postcuring station, not shown, in a known manner.

Referring to FIGS. 19–24, the structure and operation of the second embodiment of the invention is similar in part to that of the first embodiment of the invention as illustrated in FIGS. 1–14. However, in this more preferred second embodiment, a first liquid medium layer 164" (FIGS. 20–22), and subsequent liquid medium layer 170", 174" (FIG. 22), are each formed above an apertured fixed support plate member 28" entirely from above the fixed support and across the entire width of a container 24". The layers are formed from above by a liquid medium coating or dispensing mechanism 34".

With further reference to FIG. 19, an apparatus 20" includes a vertically movable energy scanning mechanism or system 32" for solidifying successive preselected cross-sections of a liquid medium 26", to form an article 22" (shown in FIG. 24), and the liquid medium coating mechanism 34" is mounted on the vertically movable scanning mechanism. A liquid medium metering device 40" is provided adjacent the bottom of a lower liquid medium storage container 25" (which corresponds to the liquid medium container sump portion 25 of the single container 24 in the first embodiment of the invention). The metering device 40" may be in the form of the withdrawal-and-feeding mechanism 40 of the first embodiment of the invention and comprising parts corresponding to the parts 128–148 thereof, but preferably is a digital metering pump, such as that available from IVEK® of Springfield, Vermont as their "DIGISPENCE" Pump No. 130.8.

The vertically movable scanning mechanism 32" comprises a horizontal support plate 42" which is connected to a vertical traversing mechanism (not shown in FIGS. 19–24), such as the mechanism 44 in FIG. 1, for raising and lowering the scanning mechanism. Similarly, as is shown in FIG. 19, a source of energy, such as a laser 50", a laser beam focusing optic system 52" and a scanner head 54", for directing the laser beam energy to solidify successive layers of the liquid medium 26", are also mounted on the support plate 42" in a suitable manner, as in the first embodiment of the invention.

Figure 20:
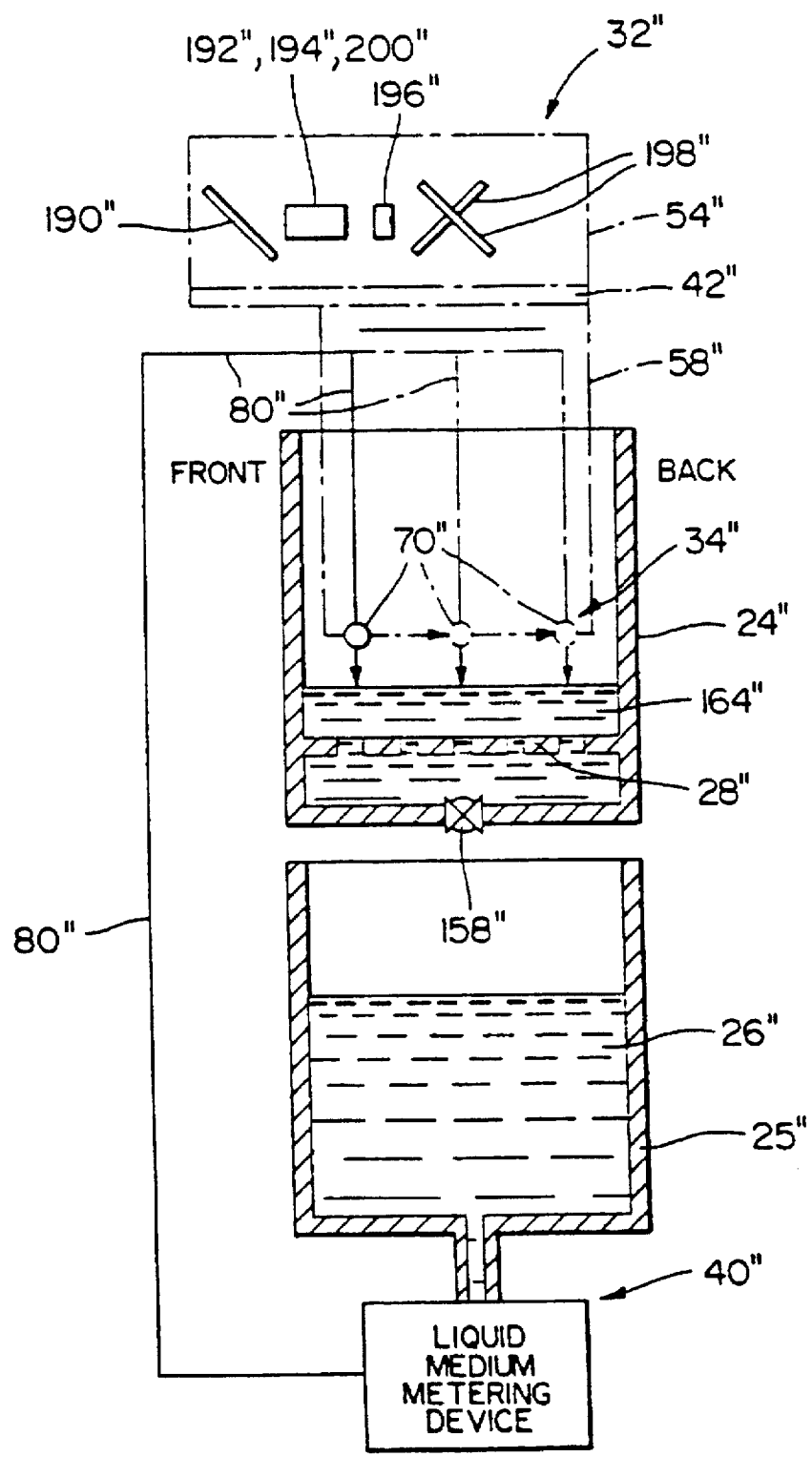
FIGS. 20 through 24 are elevational schematic views similar to FIG. 19, illustrating a sequence of steps in the forming of a solid three-dimensional article, in accordance with the second embodiment of the invention, but with a vertical central portion of the apparatus turned 90° and shown as viewed along the line 20—20 in FIG. 19.
Figure 21:
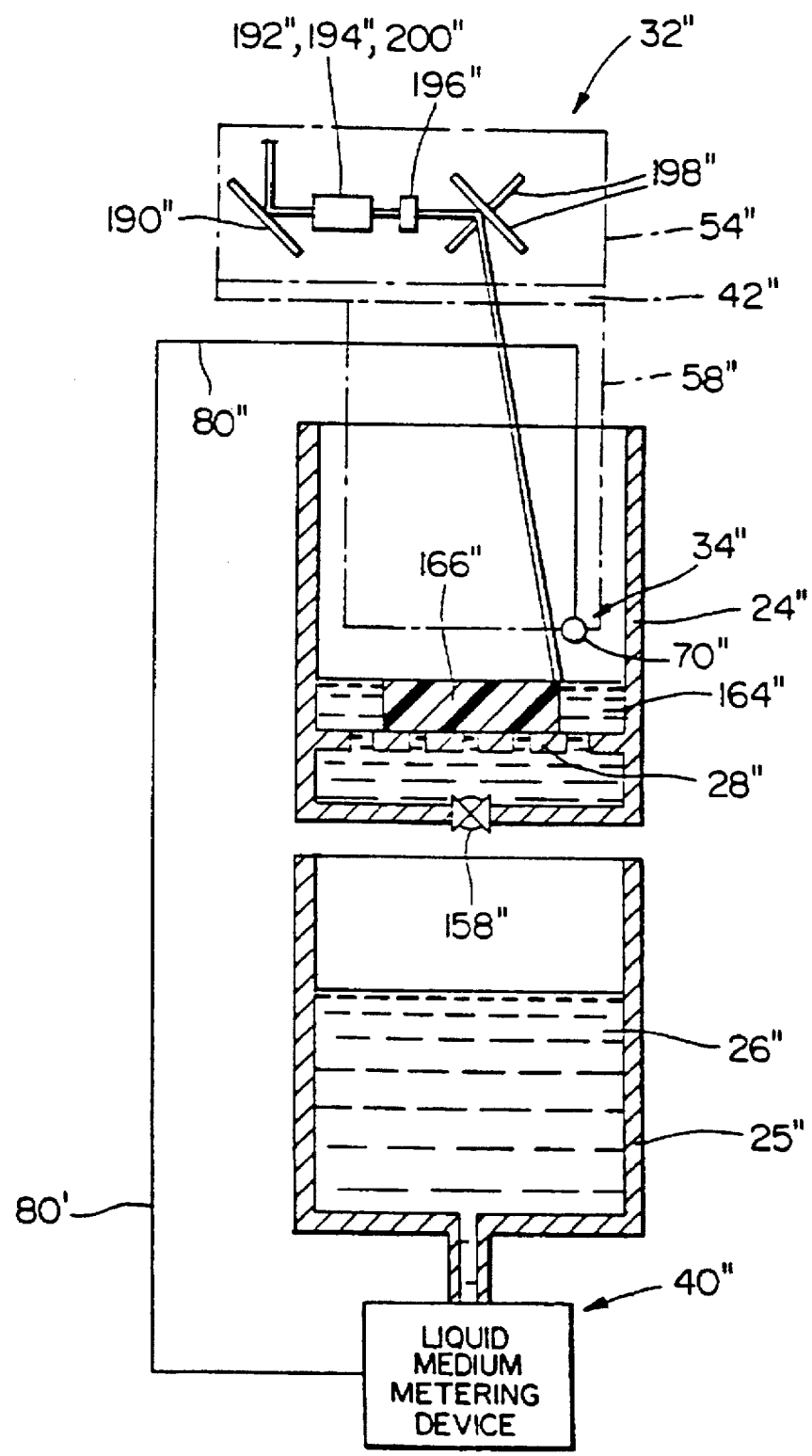
Figure 22:
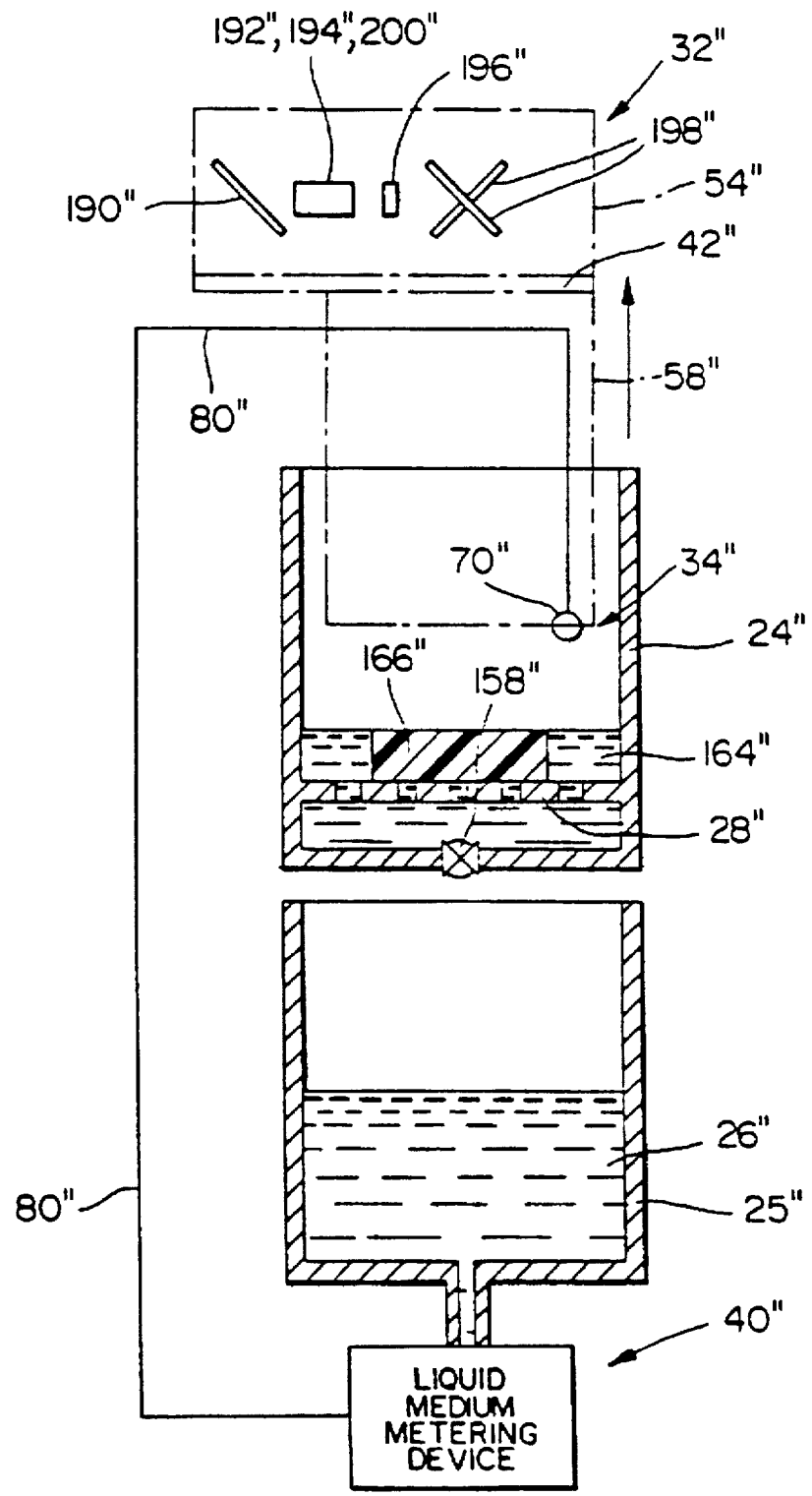

In general, the liquid medium coating mechanism 34" may comprise a sub-frame 58" mounted beneath the horizontal support plate 42", with a liquid medium spray or dispensing tube 70" mounted on the subframe and extending across the width of the container 24", as shown in FIG. 19. The dispensing tube 70" is supported on the subframe 58" for reciprocable traversing movement from adjacent one side of the container 24" to the other, as illustrated in FIGS. 20 and 22, for forming the sequential layers of the liquid medium in the container above the fixed support 28". The liquid medium 26" is fed into the dispensing tube 70" by the resin metering device 40", from the lower liquid medium storage container 25" via a flexible line 80".

With further reference to FIG. 19, as in the first embodiment of the invention, the laser beam from the laser 50" passes through a beam modulator 180", which may be used in conjunction with a blocking member 184", as a shutter, as previously described. Thus, when the beam modulator 180" is energized (by an RF signal from an RF generator, not shown), a first order portion of the laser beam passes to bending mirrors 186" and 188", and then to a bending mirror 190" of the scanning mechanism 32". Within the scanning mechanism 32", the laser beam then passes through an adjustably movable 2-axis correction focusing lens 192" on a reciprocal carriage 194", with the focusing lens and carriage being moved by a suitable servosystem 200", "on the fly", during a solidification operation, so that the impinging diameter of the laser beam remains constant as the beam is directed toward a layer of the liquid medium 26" at a direction other than perpendicular. The laser beam then passes through an objective lens 196", to X and Y scanning mirrors 198" of the scanner head 54", which direct the beam so that it is traversed across the layer of liquid medium 26" to be solidified.

Referring now to FIG. 20, this figure shows the central portion of the apparatus 20" turned 90° from the showing in FIG. 19, so that the front of the apparatus is at the left and the back of the apparatus is at the right in this figure. At the beginning of a laser modeling operation, a sufficient amount of the liquid medium 26" is withdrawn from the container 25" and introduced, via the flexible line 80" and the dispensing tube 70", into the container 24" to fill the lower portion of the container and the apertures in the fixed support plate 28" up to the top of the support plate. Preferably, the liquid medium 26" is introduced, for example, at the center and adjacent opposite ends of the dispensing tube 70", for more uniform liquid medium distribution.

As viewed in FIG. 20, the elongated dispensing tube 70" then is traversed from the left-hand side (front) of the container 24", to the right-hand side (back) of the container, as illustrated by the horizontal arrows, while the resin metering device 40" feeds a preselected amount of the liquid medium 26" from the storage container 25", to form a first liquid medium layer 164" (thickness exaggerated for purposes of illustration) above the fixed support plate 28". As viewed in FIG. 21, with the dispensing tube 70" then stopped adjacent the back of the container 24" a preselected cross-section of the initial layer 164" is solidified by the laser beam from the laser 50" (shown only in FIG. 19).

As is illustrated in FIG. 22 by the vertical arrow, the support plate 42" then is raised vertically so that the parts mounted thereon, comprising the laser 50" (FIG. 19), scanning mechanism 32" and coating mechanism 34", including the dispensing tube 70" are raised a one layer increment for a next liquid medium dispensing-and-solidifying operation.

Figure 23:
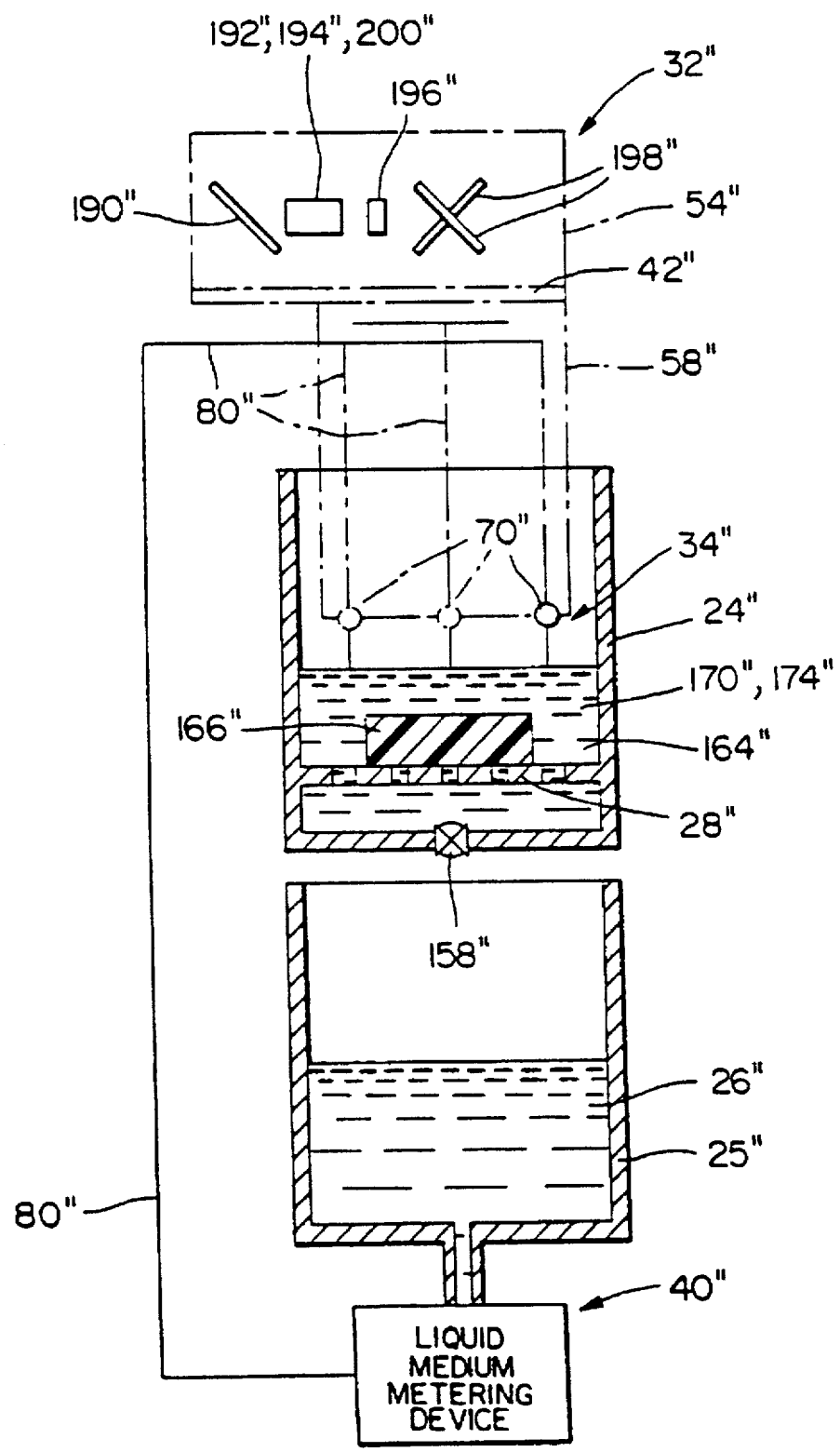
Figure 24:
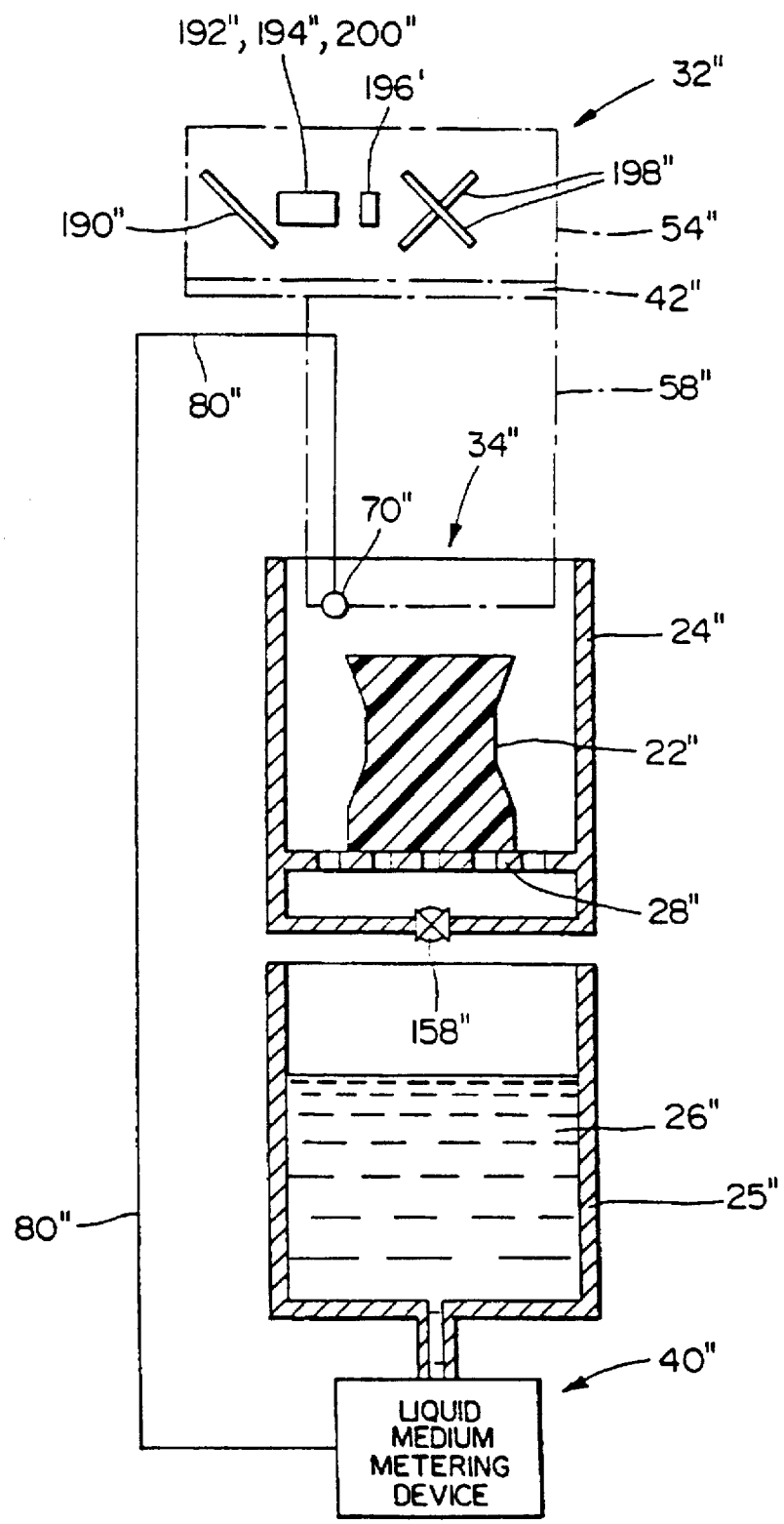

Next, referring to FIG. 23, the dispensing tube 70" is traversed from the back of the container 24", in a reverse direction (to the left in this figure) to its initial front position, while the resin metering device 40" again delivers a preselected amount of the liquid medium 26" to the dispensing tube, to form a second liquid medium layer 170", 174" (thickness also exaggerated for purposes of illustration) above the initial layer 164" and over the first-solidified article cross-section 166". With the dispensing tube 70" then located adjacent the front of the container 24", as shown in FIG. 23, a preselected cross-section of the second layer 170", 174" then is solidified by the laser beam as previously described. This procedure, of alternately dispensing a layer of the liquid medium 26" from the dispensing tube 70", solidifying a preselected cross-section of each layer by the laser beam, and raising the scanning mechanism 32" and coating mechanism 34", including the dispensing tube and other associated structure, then is repeated, until the article 22" has been completed, as illustrated in FIG. 24. The liquid medium 26" then may be drained from the container 24" by a pump (or valve) 158" into the lower liquid medium storage container 25", and the article 22" removed. In other respects, the apparatus functions essentially as shown in FIG. 17 for the first embodiment of the invention, except that a determination that the level of the liquid medium is incorrect results in operation of the coating mechanism 34", rather than the bellows 150.

Figure 25:
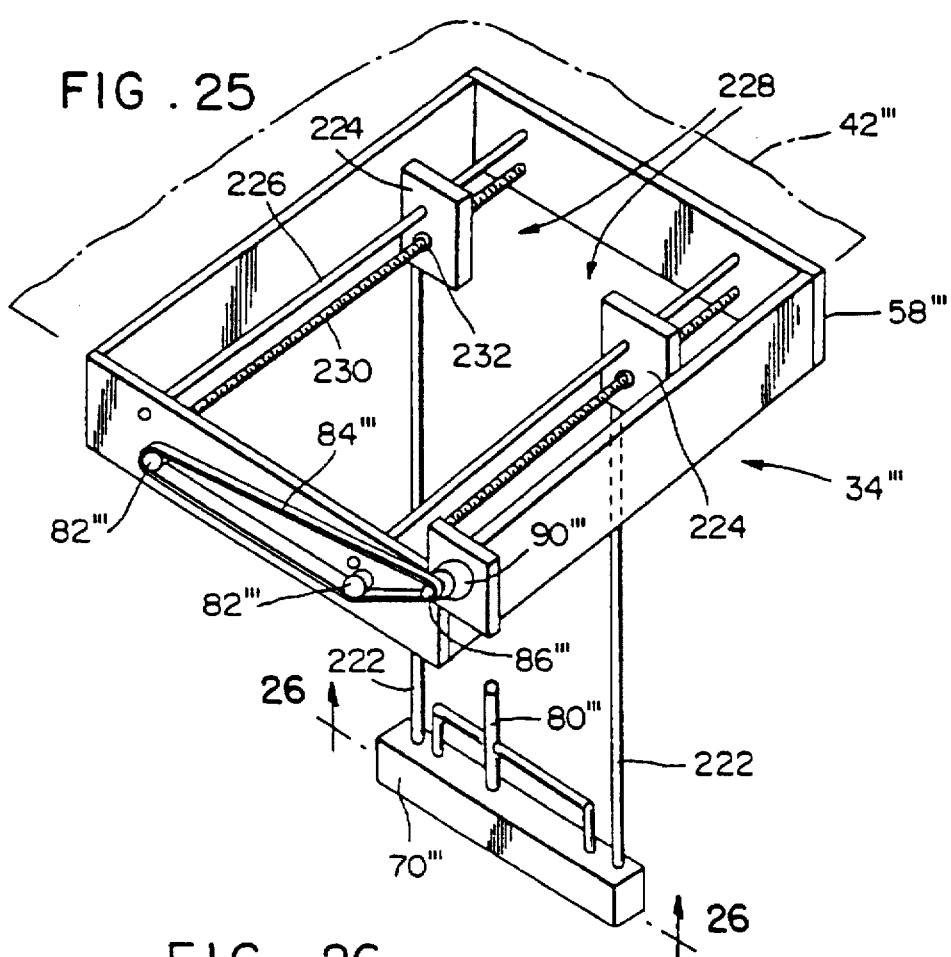
FIG. 25 is an isometric view of a modified type of liquid medium coating mechanism which may be used in the second embodiment of the invention shown in FIGS. 19–24.
Figure 26:
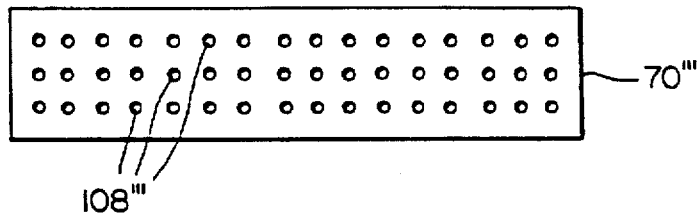
FIG. 26 is a view of the bottom of a liquid medium dispensing tube of the coating mechanism shown in FIG. 25, as seen along the line 26—26.
Figure 27:
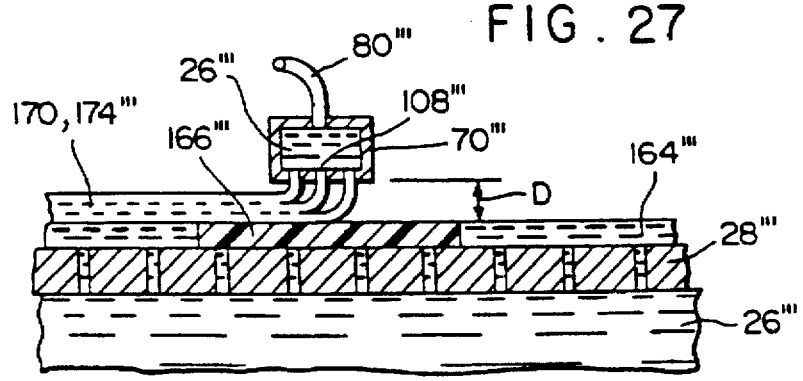
FIG. 27 is an enlarged schematic view illustrating a mode of operation of the liquid medium dispensing tube of the coating mechanism shown in FIGS. 25 and 26.

The liquid medium coating mechanism 34" may be of essentially the same construction as the liquid medium coating mechanism 34 shown in FIGS. 1–3 of the first embodiment of the invention, but preferably is of the modified type as disclosed in FIGS. 25–27. FIGS. 25–27 disclose a liquid medium coating mechanism 34'" which comprises a rectangular subframe 58'" and an apertured liquid medium coating or dispensing tube 70'" having a flexible feed line 80'" connected to a central portion and opposite end portions thereof. The dispensing tube 70'" is secured adjacent opposite ends to lower ends of vertically extending support rods 222 secured at upper ends to respective driven slide blocks 224. The slide blocks 224 are supported for sliding movement on horizontally disposed slide rods 226 having opposite ends fixedly mounted in respective ones of a pair of opposite walls of the subframe 58'". The slide blocks 226 are driven by a twin linear ball screw drive mechanism 228 comprising a pair of rotatable drive screws 230 which are threadably received in associated ball screw members 232 mounted in respective ones of the slide blocks, with opposed ends of the drive screws journaled in the opposed walls of the subframe 58'". A projecting portion of each drive screw 230 has a drive pulley 82'" fixedly mounted thereon and drivingly connected by a belt 84'" to a drive pulley 86'" on a shaft of a small reversible drive motor 90'" mounted on a projecting portion of the subframe 58'".

Referring to FIGS. 26 and 27, the bottom of the liquid medium dispensing tube 70'" includes a plurality of small apertures 108'" through which the liquid medium 26'" (shown only in FIG. 27) is forced under pressure, such as by the liquid medium metering device 40" of FIGS. 19–24, in the forming of a layer of the liquid medium. The size of the apertures 108'" is such that when pressure exerted by the liquid medium metering device 40" is interrupted, as previously described, the flow of the liquid medium 26'" through the apertures also is automatically interrupted, thus eliminating the need for any solenoid-operated shut-off mechanisms as previously described and shown in FIGS. 5C and 5D. By way of example, while the number and size of the apertures 108'" may vary depending on other process variables, such as the thickness of the layer to be formed, and the viscosity of the liquid medium 26'", in general, favorable results have been achieved in the forming of a liquid medium layer in the abovementioned range on the order of 0.0017" to 0.020" thick, using three rows of apertures spaced apart in a range on the order of 0.05" to 0.065", with the apertures in each row spaced apart in a range on the order of 0.090" to 0.105", and with an aperture size in a range on the order of 0.010" to 0.20".

FIG. 27 illustrates the use of the liquid medium dispensing tube 70'" of FIGS. 25 and 26 in the forming of a layer 170'", 174'" of the liquid medium 26'". For this purpose, the dispensing tube 70'" is located above a previously formed liquid medium layer 164'" a distance D slightly greater than the thickness of the layer 170'", 174'" being formed, so that the liquid medium 26'" is dispensed in a uniform, controlled manner as a result of capillary action and the surface tension of the liquid medium, as the liquid medium is dispensed onto the previous layer. More specifically, with the dispensing tube 70'" disclosed, the liquid medium 26'" is dispensed in the form of three rows of capillary columns to form a series of three sublayers of essentially uniform thickness, with the surface tension of the sublayers becoming broken as the sublayers engage one another, to form the unitary liquid medium layer 170'", 174'" to the desired thickness. While the distance D between the bottom of the dispensing tube 70'" and the previously formed layer 164'" may vary depending upon other process variables, such as the thickness of the layer 170'", 174'" being formed, for a layer thickness in the abovementioned range of 0.0017" to 0.020", favorable results have been achieved with the distance D in a range on the order of 0.025" to 0.035".

Figure 28:
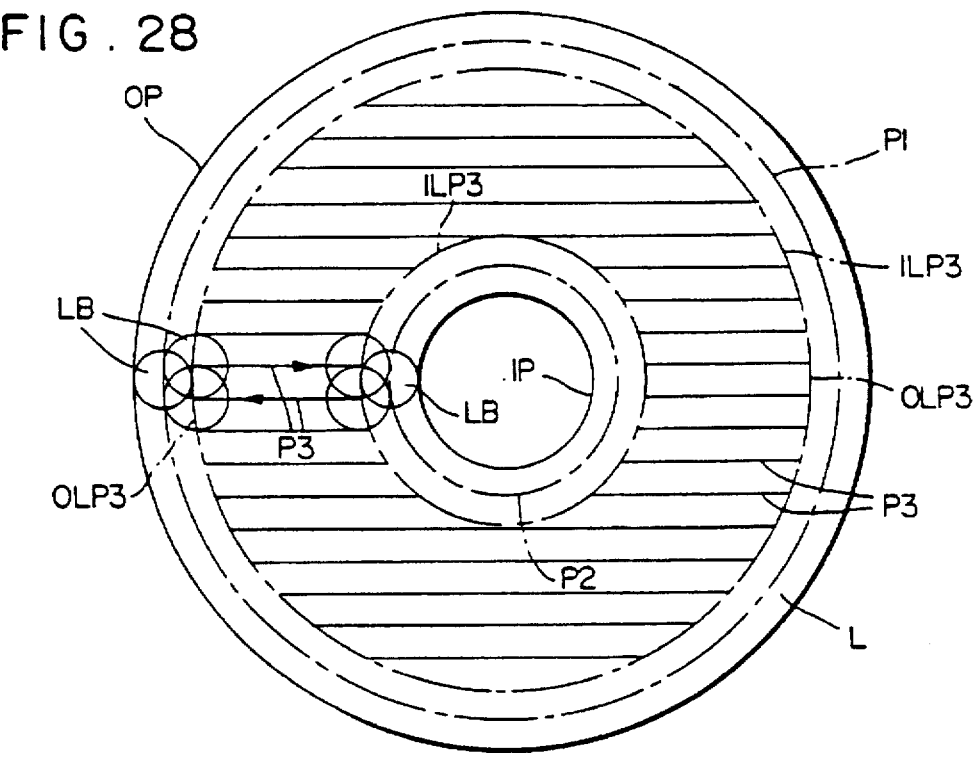
FIG. 28 is a schematic view illustrating the path of a laser beam in solidifying a cross-sectional layer of the liquid medium.

FIG. 28 is a schematic diagram illustrating a path which may be travelled by a laser beam LB in the solidification of the cross-section of a liquid medium layer L. In this instance, the layer L is illustrated as being of a cylindrical configuration, having an outer periphery OP and an inner periphery IP. To define the outer periphery OP of the layer L, the laser beam LB is directed so that the center of the beam travels along a circular path indicated by a broken line P1 spaced radially inward a distance equal to one-half the beam diameter. Similarly, the inner periphery IP of the layer L is defined by directing the laser beam LB so that the center of the beam travels along a circular path designated by a broken line P2 spaced radially outward from the inner periphery IP a distance equal to one-half the beam diameter. The remaining portion of the layer L is solidified by traversing the laser beam LB back and forth across the layer, as illustrated by solid lines P3, with each path of the laser beam overlapping a previous path, such as by one-half of the beam diameter. At the same time, the travel of the laser beam LB in either direction is terminated short of the outer and inner peripheries OP and IP of the layer L, such as by one-half the beam diameter, so that the traversing laser beam does not touch either the outer or inner periphery, so as to cause irregularities therein.

Further, in solidifying successive alternate ones of the liquid medium layers, the laser beam LB preferably is traversed in directions perpendicular to the paths P3 for the layer L to form a more uniform article structure. The layer periphery-defining paths P1 and P2 of the laser beam LB, and the layer inner portion-defining traversing paths P3 of the laser beam, also may be accomplished in any order, but preferably the outer and inner peripheries OP and IP of the layer L are defined after the layer inner portion traversing paths P3 have been completed. If desired, the size of the laser beam LB also may reduced in diameter for the purpose of defining the outer and inner peripheries OP and IP of the layer L.

Figure 29A:
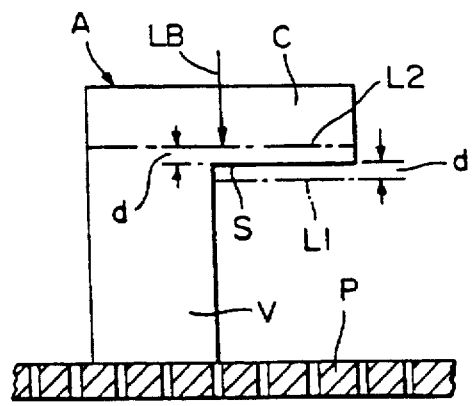
FIGS. 29A and 29B are elevational views of articles each having a downwardly facing surface, illustrating a laser beam offset feature of the invention.
Figure 29B:
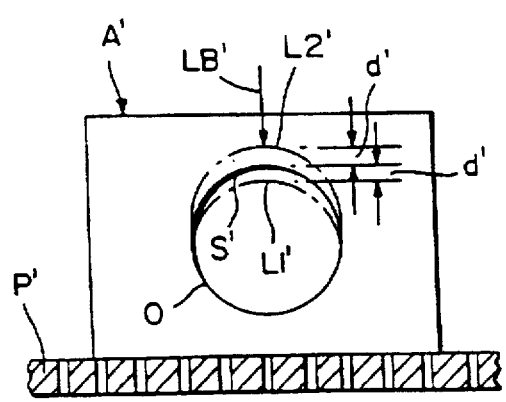

FIGS. 29A and 29B illustrate a laser beam-offset mode of operation in accordance with the invention, wherein an article being formed includes a downwardly facing surface. For example, FIG. 29A illustrates an inverted L-shaped article A on an apertured fixed support plate P, having a vertically extending portion V and a laterally projecting cantilevered portion C at its upper end, with the cantilevered portion having a downwardly facing surface S. Thus, if in the initial forming of the cantilevered portion C, a laser beam LB is directed at a surface of a liquid medium (not shown) corresponding to the downwardly facing surface S, the laser beam actually will penetrate the liquid medium to a level below the surface a distance d as indicated by a broken line L1, thereby causing an error in the configuration of the formed article A. Accordingly, in forming the surface S of the article cantilevered portion C, the laser beam LB is programmed so that it is not directed across the liquid medium above the surface until the level of the liquid medium is at a corresponding distance d above the level of the surface, as indicated by the broken line L2.

Similarly, FIG. 29B illustrates the forming of a block-shaped article A' having a central opening 0 therethrough, with the opening having an interior downwardly facing surface S'. Accordingly, as in the article A shown in FIG. 29A, in forming of the surface S' of the opening 0, if a laser beam LB' is directed to successive surface levels of a liquid medium (not shown) at points corresponding to the downwardly facing surface, because of the solidification depth penetration d' of the laser beam, the upper half of the opening will be solidified along a broken line L1', producing an error in the configuration of the formed article A'. Accordingly, as in FIG. 29A, in forming the downwardly facing surface S' of the opening 0, the laser beam LB' is programmed so that it is directed at points on successive surface levels of the liquid medium which are the distance d' above the surface S', as illustrated by the broken line L2'.

Figure 30A:
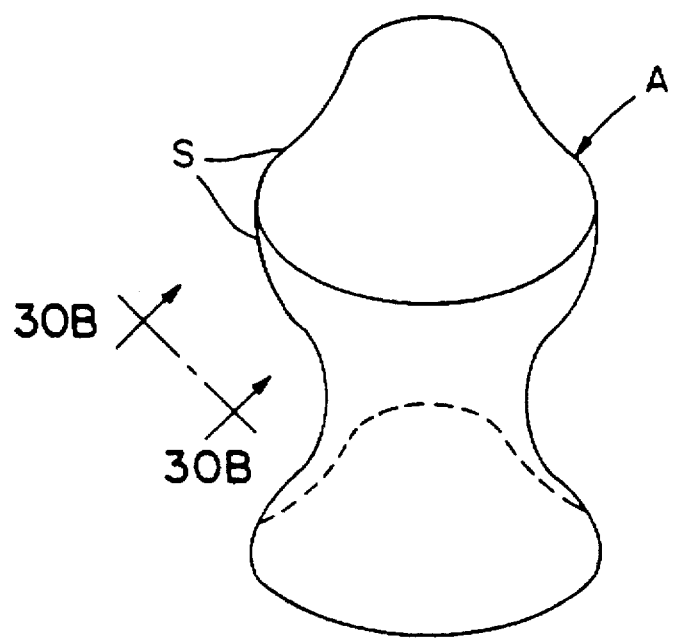
FIGS. 30A, 30B, 30C and 30D are schematic views illustrating an article curved surface interpolation feature of the invention.
Figure 30B:
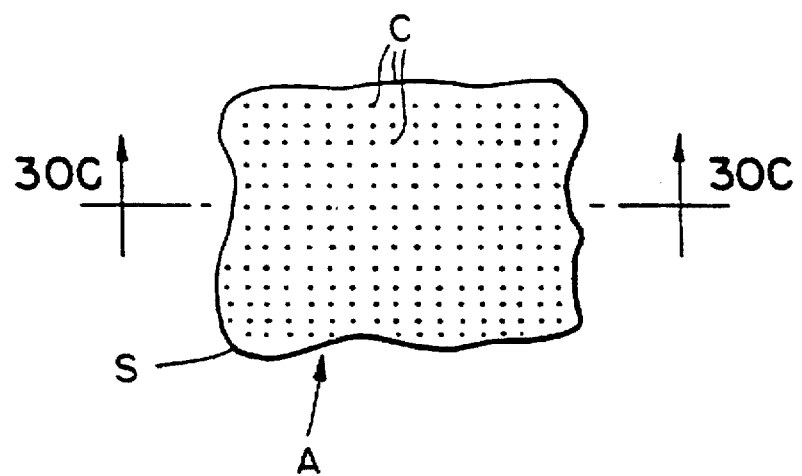

FIG. 30A shows an article A having one or more compound and/or reverse curved peripheral surfaces S, and FIG. 30B is a view of a coordinate network for a portion of one of the curved compound curved surfaces, made up of coordinates C, which may be developed utilizing the above-mentioned software of the Structure Dynamics Research Corporation. While the coordinates C are shown in the form of a grid which will define square-shaped facets on the surfaces S of the finished article A, other grid arrangements, such as triangular, rectangular or polygonal, may be used.

Figure 30C:
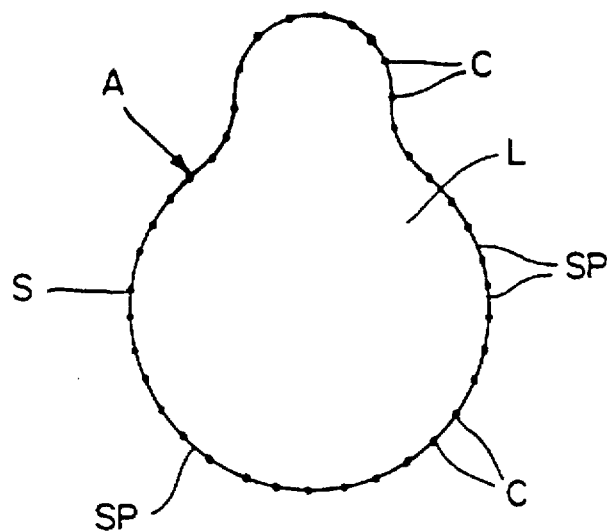

With reference to FIG. 30C, which represents a cross-sectional layer L of the article A, in utilizing the thus-defined network of FIG. 30B in forming the compound and/or reverse curved surfaces S of the article, in the past a laser beam has been directed around the periphery of the layer between successive ones of the coordinates C along straight-line paths SP. As a result, a thus-formed peripheral portion of the layer L, instead of being a true curve or series of curves, is in the form of a series of the interconnected straight-line paths SP, and the resultant curved surfaces S actually are a series of essentially flat-faced facets. This can be partially remedied by moving the coordinates C closer together, but this is disadvantageous for various reasons, such as the additional coordinate computations and coordinate memory storage required.

Figure 30D:
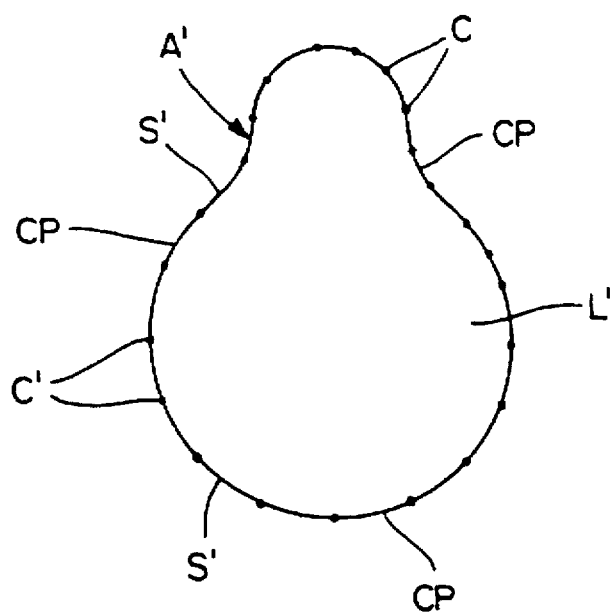

Accordingly, referring to FIG. 30D, in accordance with the subject invention, instead of moving coordinates C' for an article layer L' of an article A' closer together, the coordinates are selectively moved further apart, depending upon the sharpness of the curves being formed. The computer 168 then is programmed with artificial curve coordinate data, corresponding to a desired curve portion CP between each successive pair of the coordinates C', which has been generated by suitable software interpolation using various criteria stored in the CAD station 202, such as the known positions of each successive pair of the coordinates C', positions of the coordinates in adjacent article layers, and radii of curvature between coordinates. During the solidifying of the article A', the computer 168 then directs the laser beam in short straight-line or curved paths along the artificially created curved paths CP, to form the article A' with essentially smooth flowing curved surfaces S'.

In summary, a new and improved method of and apparatus for forming a solid three-dimensional article 22, such as the articles 22a and 22b in FIGS. 18A and 18B, respectively, or the article 22" in FIG. 24, from a liquid medium 26, has been disclosed. The method and apparatus, as disclosed in the first preferred embodiment of the invention shown in FIGS. 1–14, involves initially coating a layer of the liquid medium 26 onto the apertured support plate 28 in the liquid medium container 24, as illustrated in FIG. 8. An initial cross-section or profile 166 of the article 22 then is formed by solidifying the liquid medium 26, as illustrated in FIG. 9, and the scanner head 54 is raised one increment. Next, the liquid level of the liquid medium 26 is raised by operation of the bellows 150, to form the meniscus 172 around the solidified cross-section or profile 166 of the article 22, as illustrated in FIG. 10. Another coating of the liquid medium 26 then is applied to the solidified cross-section or profile 166 of the article 22 within the recess defined by the meniscus 172, as shown in FIG. 11, causing the meniscus to break and the liquid medium layers 170 and 174 to merge, as shown in FIG. 12. A next cross-section or profile 176 of the article 22 then is solidified by the scanning system 32, as illustrated in FIG. 13, and the scanner head 54 is again raised an additional increment. This sequence of operations then is continued until all of the cross-sections or profiles of the article 22 being formed have been completed. The scanning system 32 then may be raised to its upper "home" position by the lift mechanism 44, and the drain valve 158 for the bellows 150 opened to permit lowering of the liquid medium 26 in the container 24 to its lowermost "home" position, to permit access to the completed article 22 and removal of the article from the apparatus 20.

In the second preferred embodiment of the invention, as shown in FIGS. 19–24, which operates in essentially the same manner as the first embodiment of the invention, each layer of the liquid medium 26" is produced above the apertured fixed support plate 28" by dispensing the entire layer from the dispensing tube 70" in the container 24". Further, when the dispensing tube 70'" shown in FIGS. 25–27 is utilized, the small size of the dispensing apertures 108'" causes the tube to stop dispensing automatically in response to cessation of exerted pressure by the liquid medium metering device 40", without the use of any other type shut-off mechanism. The traversing of the dispensing tube 70'" closely adjacent each previous liquid medium layer also enables the liquid medium 26'" to be dispensed in a uniform, controlled manner as a result of capillary action and surface tension.

As stated previously, the laser 50 is preferably a visible light laser and the liquid polymer 26 is one which hardens by such laser energy. Other type lasers can be substituted for the visible light laser without departing from the invention, such as a UV light laser, a Nd-Yag laser or a $CO_2$ laser, along with a compatible polymer. Other known types of energy sources, such as other forms of UV or visible light, invisible light, cathode ray tubes, electron beams, x-rays and other forms of radiation and/or high energy beams may also be used in this invention. However, it is believed that a visible light laser is the preferred energy source because visible light lasers generally provide more energy and thus are able to achieve better solidification and definition in the hardened layer, more quickly.

Referring to FIGS. 31–35, a liquid medium applicator or dispensing device 1010 in accordance with a preferred embodiment of the invention is shown and dispenses a liquid medium 1012 which is capable of solidification when subjected to prescribed energy in the forming of a solid three-dimensional article (not shown). The applicator 1010 comprises an elongated rectangular element or coating bar member 1014 of essentially solid, rectangular construction, and formed of a suitable metal, such as stainless steel. While the bar member 1014 shown in the drawings is rectangular in cross section, other shapes, such as square and circular, can also be used.

Figure 31:
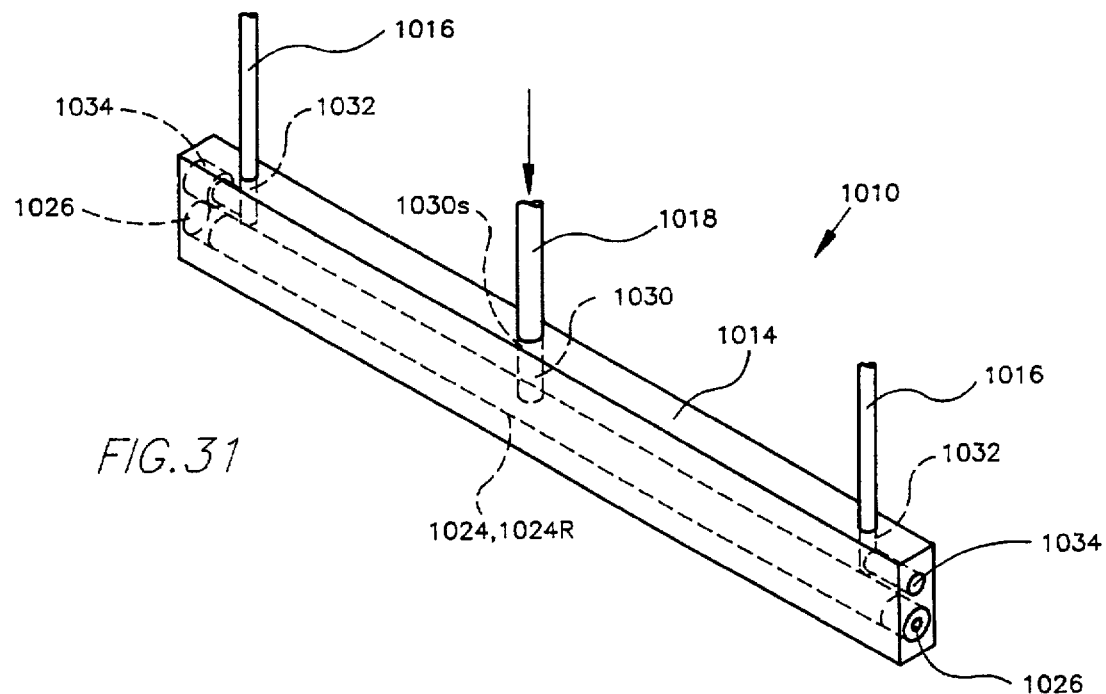
FIG. 31 is an isometric, schematic view of a liquid applicator or dispensing device in accordance with the present invention.

Referring to FIGS. 31 and 32, adjacent its opposite ends the bar 1014 is suspended by support rods 1016 from a vertically movable and horizontally reciprocable traversing mechanism (not shown), such as previously described. Further, the liquid medium 1012 (FIG. 35) is fed into the bar 1014 by a rigid feed tube 1018 connected by a suitable coupling 1020 and a flexible feed tube 1022 to a digital metering pump (also not shown), essentially as previously disclosed.

As is best shown in FIG. 32, the preferred rectangular applicator bar 1014 is provided with a longitudinally extending passageway 1024 of circular cross-section, which is closed at its opposite ends by screw-threaded plug members 1026 to define an internal liquid reservoir 1024R in the bar. The bottom of the bar 1014 is provided with an array of liquid dispensing passageways in the form of circular apertures 1028 arranged, preferably, in at least three rows, as shown in FIGS. 33 and 34. The rigid feed tube 1018 is retained in the bar 1014 by screw threads 10308 in a vertical central passageway 1030 (FIGS. 31, 32 and 35) in which a discharge end of the rigid feed tube is screw-threadably mounted. The support rods 1016 are secured to the bar 1014 by lower ends of the rods being received in vertical passageways 1032 (FIG. 32) at the opposite ends of the bar, and by retaining screw members 1034 screw-threadably mounted in horizontal passageways 1036 in opposite ends of the bar for engagement with the support rods. To avoid interference with associated superstructure (not shown), the left-hand support rod 1016, as viewed in FIG. 32, is located further from its adjacent end of the bar 1014 than is the right-hand support rod, and the adjacent end of the bar is provided with an enlarged counter-drilled passageway 1036c for receiving the associated screw 1034 for retaining the end of the support rod 1016.

Figure 35:
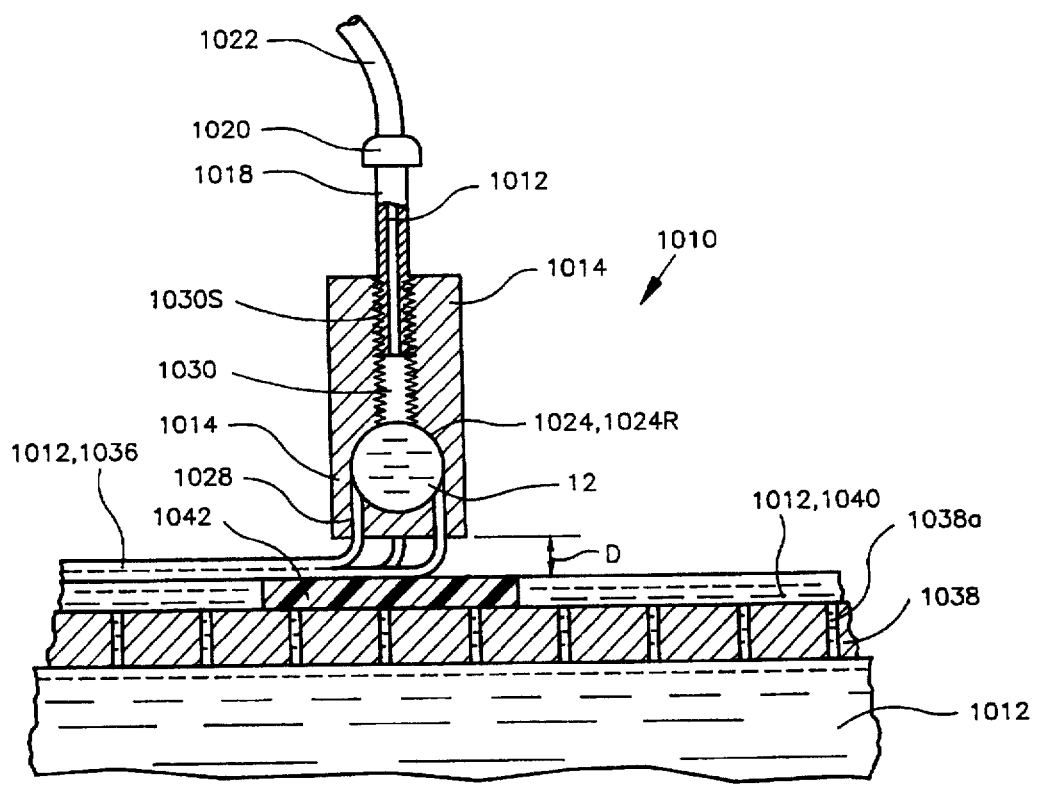
FIG. 35 is an enlarged schematic, cross-sectional view, taken essentially along the line 5—5 in FIG. 32, illustrating a mode of operation of the liquid dispensing device shown in FIGS. 31-34.

In the preferred embodiment of the invention shown in FIGS. 31–35, in which the dispensing apertures 1028 of the applicator bar 1014 are arranged in three rows, as is best shown in FIG. 34, the apertures in the outer two rows are aligned with one another, with the apertures in the center row being offset with respect to the apertures in the outer rows. Thus, the apertures 1028 of the center row dispense liquid medium in spaces between the apertures of the two outer rows, to provide uniform dispensing of the liquid medium in layers of uniform thickness during an article-forming operation. In this connection, FIG. 35 illustrates the use of the liquid medium applicator bar 1014 in the forming of a layer 1036 of the liquid medium 1012. For this purpose, as was previously disclosed, an apertured, horizontal rigid support plate 1038 is mounted in a fixed position in a container (not shown) for holding the liquid medium 1012, and initially the liquid medium is dispensed into the container from the applicator bar. 1014 to fill the container, including apertures 1038a in the support plate, to the top of the support plate. An initial liquid medium layer 1040 then is dispensed onto the rigid support plate 1038 by the applicator bar 1014, and a desired cross-section 1042 of the initial layer then is solidified by traversing a laser beam, not shown, in a suitable pattern.

After the dispensing of the initial liquid medium layer 1040, and solidifying the desired layer cross-section 1042, the application bar 1014 is raised by a lifting mechanism (not shown) to locate the bar above the medium surface a distance D slightly greater than the thickness of the next layer 1036 to formed. The next medium layer 1036 then is dispensed and, a portion of the layer 1036 is solidified by the above-mentioned laser beam (not shown). This sequence of operations is repeated until the three dimensional part or model (not shown) being formed has been completed, or "grown". By spacing the bar 1014 above the medium layer a prescribed distance, the liquid medium 1012 can be dispensed in a uniform, controlled manner utilizing the capillary action and the surface tension of the liquid medium. More specifically, with the applicator bar 1014 disclosed in FIGS. 31–35, the liquid medium 1012 is dispensed in the form of three rows of capillary columns to form a series of sublayers (FIG. 35) of essentially uniform thickness. In this arrangement, columns of one outer row become superimposed on the columns of the other outer row, and the columns of the center row become disposed there between. As the sublayers engage one another, the surface tension of the sublayers becomes broken to form the unitary liquid layer 1036 of the desired thickness.

The distance D between the bottom of the dispensing bar 1014 and the surface of the medium 1012 may vary depending upon other process variables, such as the thickness of the layer to be formed. However, as a general guideline, for a layer thickness in the range of about 0.0017 inch to about 0.020 inch, the distance D should be in a range of about 0.025 inch to about 0.035 inch, as disclosed previously.

In the embodiment of the invention shown in FIG. 36, dispensing apertures 1028' in an applicable bar 1014' also are arranged in three rows, but the apertures in each row are offset with respect to the apertures in each of the other rows. Thus, the first three apertures 1028' at one end of the applicator bar 1014' define a pattern which creates three longitudinally separated liquid medium dispensing paths as the bar is traversed, with this same dispensing pattern being repeated along the length of the bar to its opposite end, thereby again providing a relatively uniform dispensing of the liquid medium 1012.

The number and size of the dispensing apertures 1028 and 1028' in the dispensing bars 1014 and 1014', as disclosed in FIGS. 34 and 36, respectively, may vary depending on other process variables, such as the thickness of the liquid medium layer (such as 1036 and 1040) to be formed, and the viscosity of the liquid medium 1012. In general, however, with reference to FIG. 34, in the forming of a liquid medium layer (such as 1036 and 1040) in the above-mentioned range on the order of 0.0017 inch to 0.020 inch thick, the rows of the apertures 1028 may be spaced apart a distance DR in a range of about 0.055 inch to about 0.070 inch, with the apertures in each row spaced apart a distance DA in a range of about 0.090 inch to about 0.110 inch, an aperture diameter in a range of about 0.010 inch to about 0.020 inch, and the apertures in the center row spaced longitudinally with respect to the apertures in the outer rows one half the distance DA, i.e., DA/2. Similarly, in the embodiment of the invention shown in FIG. 36, a same range for the aperture row spacing DR' may be used, with an aperture diameter in a range of about 0.010 inch to about 0.030 inch, and the apertures 1028' in each row spaced apart a distance DA' in a range of about 0.220 inch to about 0.230 inch. Each aperture 1028' in each row also may be spaced from the next aperture in the next row by one-third the distance DA', i.e., DA'/3, whereby successive apertures are equally spaced and offset the same distance from one another in a longitudinal direction.

With reference to the embodiment of the invention shown in FIG. 37, an applicator bar 1014" is provided with dispensing passageways in the form of elongated slots 1028" inclined to the longitudinal axis of the bar at an angle A in a range of about 200 to about 300, with a width W of the slots being in a range of about 0.010 inch to about 0.020 inch, and with a slot overlap distance OD, as measured longitudinally along the bar, in a range on the order of 10%–20% of the longitudinal length SL of the bar encompassed by each inclined slot. As a result, the liquid medium 1012 is dispensed from the bar 1014" across the entire width thereof, to provide an essentially uniform layer of the liquid medium, and to ensure complete coverage of each succeeding layer of the liquid medium, for the solidifying operation.

In summary, a new and improved device 1010, for dispensing a liquid medium 1012 in the form of thin uniform layers on top of the medium surface in a container or vat of a laser modeling machine, has been disclosed. The device 1010 includes the rectangular applicator bar 1014 of essentially solid construction, having the longitudinally extending passageway 1024 formed therethrough, to define an internal liquid medium reservoir 1024R in the bar. The liquid medium 1012 is fed into the reservoir 1024R by a centrally located feed tube 1018 and is dispensed through a series of apertures 1028 in the bottom of the bar which are in fluid communication with the bar reservoir. The diameter, length, shape and number of the apertures is selected with respect to the size and length of the reservoir such that the liquid flow through each of the apertures is essentially uniform irrespective of an aperture's distance from the feed tube 1018, and no liquid medium is dispensed from the bar when the feed pump is not operating. In other words, looking at FIGS. 32 and 33, the liquid flow from an aperture near the end of the bar 1014 is essentially the same as the flow from an aperture at the bar center. Also, in order to get liquid to flow from the bar there must be a positive pressure from the metering pump.

While it is preferable that the feed tube 1018 be centrally positioned along bar 1014, one or more feed tubes may be located at the ends of the bar. Depending on the length of the bar, it may be necessary to taper the reservoir 1024R to ensure uniform flow from the apertures when dispensing the medium layer.

Further, the applicator bar of the present invention has been especially designed for use in dispensing thin layers of medium uniformly over the medium surface in a model making vat of a laser modeling machine of the type disclosed previously, especially the form shown in FIGS. 19–27. The preferred applicator has been found particularly useful for dispensing liquid medium comprising liquid resins in such laser modeling machines having viscosities up to 500 centipoise and as low as about 100 centipoise. It is believed a more viscous and less viscous liquid mediums can be dispensed in applicators of the present invention for laser modeling machines simply by varying the aperture and reservoir sizes and lengths. Very little experimentation should reveal the appropriate sizes and lengths.

Still further, it may be desirable to vary the distance D from which the bar is spaced above the medium surface as each new layer is dispensed, depending on the characteristics of the resin or other liquid medium being dispensed. The distance D can vary so long as the requisite capillary action and surface tension of the liquid maintain a continuous curtain of liquid between the bottom of the applicator bar and the top surface of the medium.

While the applicator of the present invention is especially designed for laser modeling systems employing a fixed platform, it may be applicable to other systems, laser modeling and otherwise. It is therefore understood that the foregoing description and accompanying drawings set forth the preferred embodiments of the invention at the present time. Various modifications, additions and alternative designs will, of course, become apparent to those skilled in the art in light of the foregoing teachings without departing from the spirit and scope of the disclosed invention. Thus, it should be appreciated that the invention is not limited to the disclosed embodiments but may be practiced within the full scope of the appended claims.

What is claimed is:

1. Apparatus for forming a three-dimensional object from successively solidified layers of a liquid medium solidifiable by application of a prescribed energy, the apparatus comprising:

a container;

a dispenser movable over a surface of a last-solidified layer to dispense the liquid medium for forming a fresh layer of the liquid medium over the surface;

an optical scanner for selectively applying the prescribed energy to the fresh layer to form the next solidified layer in accordance with a defined pattern; and a pump functionally connected to the container to withdraw a quantity of the liquid medium therefrom and functionally connected to the dispenser to feed a quantity of withdrawn liquid medium to the dispenser.

2. The apparatus as claimed in claim 1 wherein the dispenser comprises an elongated tube from which liquid medium is dispensed.

3. The apparatus as claimed in claim 2 wherein the elongated tube includes a plurality of apertures from which liquid medium is dispensed.

4. The apparatus as claimed in claim 3 wherein each aperture is sized to dispense liquid medium only when pressure is applied to the liquid medium.

5. The apparatus as claimed in claim 1, wherein the pump is adapted to withdraw a known, metered, quantity of liquid medium from the container and to feed a known, metered, quantity of liquid medium to the dispenser.

6. The apparatus as claimed in claim 1, wherein the container further comprises a first part and a second part, wherein the article is formed in the first part and the second part provides storage for a reservoir of the liquid medium, and wherein the pump is coupled to the second part, and wherein the first part and the second part being coupled by means operable to allow liquid medium to flow from the first part to the second part.

7. The apparatus as claimed in claim 1, wherein the pump is a metering pump.

8. The apparatus as claimed in claim 2, wherein the elongated tube includes an elongated slot from which the liquid medium is dispensed.

9. The apparatus as claimed in claim 2, wherein the elongated tube includes a plurality of apertures from which liquid medium is dispensed.

10. The apparatus as claimed in claim 9, wherein each aperture is sized to dispense liquid medium only when pressure is applied to the liquid medium.

11. The apparatus as claimed in claim 1 further comprising means for positioning the dispenser relative to the last-solidified layer such that the dispenser moves closely adjacent the last-solidified layer so that the liquid medium is dispensed from the tube in a uniform, controlled manner by capillary action and surface tension.

12. The apparatus as claimed in claim 1, wherein the optical scanner includes a laser for generating the prescribed energy in the form of visible light.

13. The apparatus as claimed in claim 1, wherein the optical scanner includes a laser for generating the prescribed energy in the form of UV radiation.

14. Apparatus for forming a three-dimensional object from successively solidified layers of a liquid medium solidifiable by application of a prescribed energy, the apparatus comprising:

a container for holding the liquid medium;

means, movable over a surface of a last-solidified layer, for dispensing the liquid medium for forming a fresh layer of the liquid medium over the surface; and means for selectively applying the prescribed energy to the fresh layer to form the next solidified layer in accordance with a defined pattern; and means connected to the container to withdraw a quantity of the liquid medium therefrom and connected to the dispenser to feed a quantity of withdrawn liquid medium to the dispenser.

15. The apparatus as claimed in claim 14 wherein the means to withdraw and feed a quantity of liquid medium is a metering pump.

16. Apparatus for forming a solid three-dimensional article from a liquid medium capable of solidification, including a first solidified cross section of the three dimensional object, when subjected to prescribed energy, which comprising:

a container;

a support in the container for supporting the three-dimensional article being formed, relatively displaceable with respect to the liquid level, such that the relative displacement results in the formation of a meniscus around the periphery of the first cross-section;

a horizontally reciprocating dispenser for coating a second cross-section of the liquid medium directly onto the solidified first cross-section of the three-dimensional article so as to fill the meniscus with the liquid medium from above and so that the meniscus surrounding the solidified first cross-section is broken and the second cross-section of the liquid medium and the liquid medium surrounding the second cross-section flow together;

a scanner operative to selectively solidify the second cross-section of the liquid medium, to form a second solidified cross-section of the three-dimensional article; and a computer programmed to repetitively form the meniscus, reciprocate the dispenser and operate the scanner to form the three-dimensional article.

17. The apparatus as claimed in claim 16 wherein the support is a fixed support.

18. Apparatus for forming a three-dimensional article from a liquid medium capable of solidification when subjected to prescribed energy, which comprises:

a container;

a support to support the article being formed;

a dispenser for dispensing liquid medium from above the three-dimensional article being made;

a pump for intermittently withdrawing a portion of the liquid medium from a lower portion of the container below the support and feeding the liquid medium to the dispenser;

a scanner for directing the energy onto the liquid medium, to form a cross-sectional portion of the three-dimensional article;

a computer programmed to operate the dispenser, pump and scanner to form the three-dimensional article from a plurality of solidified cross-sections.

19. The apparatus as claimed in claim 18 wherein the support is a fixed support.

20. The apparatus as claimed in claim 1, wherein the dispenser is essentially solid in construction and further comprises:

an elongated passageway, longitudinally formed therethrough, to define a liquid reservoir;

means at opposite ends of the dispenser for supporting the dispenser on a traversing mechanism;

means in the dispenser for receiving incoming liquid resin and extending through the dispenser into the liquid resin reservoir; wherein the liquid resin reservoir is located adjacent the dispensing side of the bar, and the resin receiving means and the device support means located adjacent an opposite side of the bar; and apertures extending in a plurality of longitudinal rows, wherein at least one row of apertures is offset longitudinally from a second row of apertures.

* * * * *